United States Patent Office 3,426,021
Patented Feb. 4, 1969

---

3,426,021
PHOSPHINE COMPOUNDS
Dietmar Seyferth, Arlington, Mass., assignor to The Dow Chemical Company, Midland, Mich., a corporation of Delaware
No Drawing. Filed Mar. 2, 1964, Ser. No. 348,812
U.S. Cl. 260—246         73 Claims
Int. Cl. C07d 87/46; C07f 9/16, 9/28

ABSTRACT OF THE DISCLOSURE

This invention relates to certain organic phosphine chalkogenides, organometallic derivatives thereof and certain preparative intermediates. It is also relates to processes for reacting organometallic groups with phosphine chalkogenides and certain metathetical substitution reactions. The final products are useful as insecticides and microbiocides.

---

The present invention is concerned with phosphorus chemistry and with organometallic chemistry, and is particularly concerned with novel phosphorus compounds, methods for their synthesis, intermediate compounds to be used in their synthesis, and novel methods for preparation of the said intermediate compounds.

The novel intermediates of the present invention are compounds of the formula

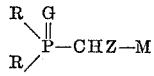

Throughout the present specification and claims, each R represents a member of the group consisting of phenyl, naphthyl, substituted phenyl and substituted naphthyl, wherein any substituent is selected from nitro, phenyl, phenoxy, loweralkylsulfonyl, phenylsulfonyl, loweralkyl and loweralkoxy, G is a chalkogen of atomic number from 7 to 35, both inclusive, Z is hydrogen or a loweralkyl group, and M is a member of the group consisting of lithium and MgX' wherein X' is halogen selected from chloro, bromo, and iodo. Loweralkyl and loweralkoxy are defined in the present specification and claims as alkyl and alkoxy, respectively, being of from 1 to 8, inclusive, carbon atoms.

Recent activity in the field of organometallic compounds has led to recent changes in standardized nomenclature of such substances. Prior to 1963 a compound of the present invention that employs lithium would, in the nomenclature of Chemical Abstracts, be called a "lithioalkyl diaryl phosphine oxide." Later naming would identify the same substance as a "(diaryl phosphinylalkyl) lithium" compound.

Compounds wherein M represents MgX will be recognized as special types of Grignard reagent, and can be called, for example, [(diarylphosphinyl)alkyl]magnesium halides, or [(halomagnesium)alkyl]diarylphosphine chalkogenides.

Those familiar with systematic chemical names will encounter no serious difficulty in either of the two systems.

The novel intermediate compounds are readily prepared by the novel process of reacting a triaryl phosphine chalkogenide of the formula

wherein R has the value hereinbefore stated, and G is a chalkogen selected from oxygen, sulfur, and selenium, with a loweralkyl metal compound of the formula ZCH₂M wherein Z is hydrogen or loweralkyl and M has the values hereinbefore defined. The triaryl phosphine chalkogenide and alkylmetal compound are consumed in equimolecular amounts with preparation of the desired (diarylphosphinyl alkyl) lithium or (diarylphosphinothioyl alkyl) lithium or (diarylphosphinoselenoyl alkyl) lithium or [(diarylphosphinyl)] akyl magnesium halide, or [(diarylphosphinothioyl)] alkyl magnesium halide, or [(diarylphosphinoselenoyl)] alkyl magnesium halide. In each case, arene of reaction is produced.

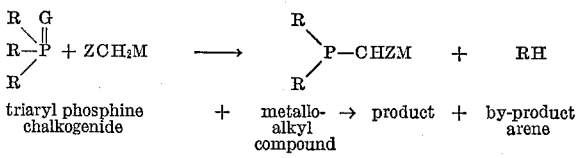

| triaryl phosphine chalkogenide | + | metallo-alkyl compound | → | product | + | by-product arene | wherein R, G, and Z and M have the values hereinbefore set forth.

The reaction is carried out by reacting the said triarylphosphine chalkogenide and alkylmetallic compound. This is done in liquid reaction medium of which the molecule contains oxygen. Desirably, the preparative reaction and all related procedures are carried out in the absence of substances known to be reactive with organolithium compounds or Grignard reagents, such as carbon dioxide, oxygen, or air; and under essentially water-free conditions. The reactants are consumed in equimolecular amounts. They can be combined in any proportions but the use of equimolecular proportions is preferred.

The reaction goes forward satisfactorily upon the combining of the reactants under conditions such as temperature, pressure, radiation, mole concentration of reactants and the like of a very wide range, such as from at least —15° C. to +50° C. or even higher. Ordinary laboratory room conditions are satisfactory, there being apparently no unusual condition requirements: cooling of the reaction mixture may be desirable.

In carrying out the reaction, the triarylphosphine chalkogenide is contacted with a metalloalkyl compound, such as a loweralkyllithium or a loweralkyl magnesium halide. Conveniently, the contacting is carried out with each reactant dispersed in liquid reaction medium. Media suitable to the Grignard reaction are suitable in the present reaction. A suitable medium is diethyl ether. Other suitable media include tetrahydrofuran, ethyleneglycoldimethyl ether and in some cases, dioxane. A mixture of such media can be used. The dispersion of reactant in medium may be as solution or suspension, and the suspension may be a thick suspension such as a slurry or paste.

If the dispersions are to be held for an appreciable period of time before use in the present process, they can advantageously be held in an atmosphere of dry nitrogen and in the presence of a desiccating agent such as soda lime, and the like.

The dispersions of the chalkogenide and metalloalkyl compound are caused to react by bringing them together into the same vessel and intimately combining them together as with mixing and stirring; whereupon reaction occurs. The aryl phosphine chalkogenide, if not theretofore in solution, dissolves by reaction. When lithium is employed the production of the compound is typically accompanied with production of a strong color, commonly representing a bathychromic shift of the transmission absorption maximum of incident visible light. The reaction goes forward promptly to prepare desired product and arene byproduct in good yield, typically yield higher than 80 percent by weight of limiting starting material. Some amount of product is prepared immediately upon the combining of the reactants. Maximum yields are obtained in a short time such as from 10 minutes to 6 hours.

The desired intermediate product can be, and often preferably is left in the reacted mixture wherein it was prepared, desirably in the essential absence of oxygen and water, and at a subsequent time employed therein. Separation and purification are typically unnecessary, although the processes are not more difficult than is expected of substituted alkali metal alkyls, or Grignard reagent substances.

When it is desired to obtain the present product in essentially pure form, conventional procedures are employed. Typically, product is precipitated from solvent by increasing to a level above saturation its concentration in solvent, which can be liquid reaction medium. Desired concentration can be achieved by employing reactant substances in initially high concentration in reaction medium or by vaporizing and removing part, such as a major part, of reaction medium, whereupon product can be removed by separation, as by centrifugation, filtration, or the like.

Product can be obtained solvent-free, or essentially so, by vaporizing and removing solvent from the crystalline precipitate; however, it will usually be preferred to keep the product in liquid medium, desirably in a solvent, such as diethyl ether.

The following detailed preparations illustrate the best methods now known, to practice the invention in the synthesis of the novel intermediate substances.

EXAMPLE 1

(Diphenylphosphinylmethyl)lithium

Triphenylphosphine oxide (14.2 grams; 0.05 moles) is dispersed as a slurry in 250 milliliters dry diethyl ether. The resulting slurry, which is maintained in suspension by continuous stirring, is purged and blanketed with nitrogen at room temperature. Thereto, also at room temperature is added 2.9 milliliters of 1.73 molar solution of methyllithium in dry diethyl ether. This addition represents 1.1 grams, 0.05 mole methyllithium. The addition is made dropwise, slowly, at room temperature, and over a period of time, through the nitrogen blanket. As the methyllithium becomes mixed with the triphenylphosphine oxide suspension, the said oxide dissolves and a color-change from white or colorless toward orange-red results. As the addition is completed, the resulting reaction mixture becomes entirely an orange-red transparent solution. This solution contains approximately 0.05 mole (diphenylphosphinylmethyl)lithium.

The compound is highly reactive and therefore especially useful in preparation of various derivatives, as are more fully set forth hereinafter. However, because of its reactivity, the compound is advantageously maintained in organic solution, such as dry diethyl ether solution in which it was prepared, and under nitrogen blanket. The compound is of the structural formula

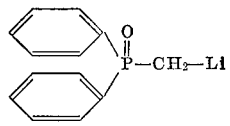

The product is found, upon flame photometric analysis, to contain approximately 3.1 percent by weight lithium.

A portion of the diethyl ether solution of (diphenylphosphinylmethyl)lithium is then treated with excess aqueous 48 percent hydrobromic acid. Upon being shaken, and thereafter being permitted to stand, the resulting mixture segregates into an aqueous and an organic layer. A vapor phase chromatogram of a sample of the organic layer, compared with a previously prepared standardized vapor phase chromatogram, establishes the presence therein of 0.0437 mole benzene, corresponding to 87.5 percent conversion of the original triphenylphosphine oxide.

The aqueous layer is saturated with potassium bromide and the resulting saturated solution thereafter extracted with chloroform to obtain 9 grams of solid methyldiphenylphosphine oxide as derivative of the said lithium compound. The yield corresponds to 83.5 percent conversion based upon either starting triphenylphosphine oxide or methyllithium. Identity of the methyldiphenylphosphine oxide is established by infrared spectrum and by melting temperature. The melting temperature of the present derivative methyldiphenylphosphine oxide as prepared by evaporation of chloroform solvent is 109–111° C. and this is the same as the melting temperature of a mixture of the said product with an authenic sample of methyldiphenylphosphine oxide and corresponds, as well, to the published value thereof.

The (diphenylphosphinylmethyl) lithium compound is poured as ethereal solution upon solid carbon dioxide ("dry ice") whereupon reaction takes place and there is produced diphenylphosphinylacetic acid of the formula

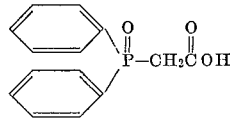

EXAMPLE 2

1-(diphenylphosphinyl)ethyllithium

Triphenylphosphine oxide (14.2 grams; 0.05 mole) is dispersed as a slurry in 250 milliliters dry diethyl ether. The resulting slurry, which is maintained in suspension by continuous stirring, is purged and blanketed with nitrogen at room temperature. Thereto, also at room temperature, is added an ether solution containing 1.8 grams (0.05 mole) ethyllithium. The addition is made dropwise, slowly, at room temperature, and over a period of time, through the nitrogen blanket. As the ethyllithium becomes mixed with the triphenylphosphine oxide suspension, the said oxide dissolves and a color change from white or colorless toward orange-red results. As the addition is completed, the resulting reaction mixture becomes entirely an orange-red transparent solution. This solution contains approximately 0.05 mole 1-(diphenylphosphinyl)ethyllithium. The compound is of the structural formula

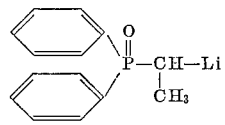

The compound is of approximately 3 percent lithium by weight, as determined by flame photometric analysis. By vapor phase chromatogram it is ascertained that benzene of reaction is of an amount representing about 85 percent conversion of the triphenylphosphine oxide.

Upon reaction with aqueous hydrobromic acid, the compound forms lithium bromide of reaction and ethyldiphenylphosphine oxide, the identity of which is confirmed by infrared spectrum.

Triphenylphosphine oxide and ethyl magnesium iodide react in essentially analogous manner to obtain a (1-(diphenylphosphinyl)ethyl) magnesium iodide of the formula

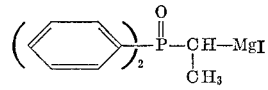

The compound exhibits a pattern of reactivities essentially the same as those of the 1-(diphenylphosphinyl) ethyl lithium.

The ethyl magnesium iodide is prepared in routine procedures appropriate to the preparation of Grignard reagents.

EXAMPLE 3

(Diphenylphosphinothioylmethyl)lithium

The present example is carried out in procedure similar to the foregoing except that, as solvent, there is employed a mixture of approximately equal amounts of diethyl ether and tetrahydrofuran. Triphenylphosphine sulfide is dispersed as a slurry in the said solvent mixture. Thereto, with stirring, is added methyllithium in amount equimolecular with the said sulfide. The triphenylphosphine sulfide slurry is converted, by reaction, into a solution. As a result of these procedures there is obtained, in solution in the ether-tetrahydrofuran mixture, and under nitrogen blanket, and with bathychromic color change, a diphenylphosphinothioylmethyllithium product. The compound contains approximately 2.75 percent lithium by weight, as determined by flame photometric analysis; reaction with hydrobromic acid converts it to methyl diphenylphosphine sulfide, the identity of which is established in routine analytical procedures and confirmed by infrared spectrum.

In manners similar to the foregoing, employing triphenylphosphine sulfide and butyllithium their is obtained a 1-(diphenylphosphinothioyl)butyllithium product, and benzene of reaction. The compound has a molecular weight of 285.3, and a lithium content of 2.42 percent. By reaction with hydrobromic acid, the compound is converted to butyl diphenylphosphine sulfide, of which the identity is established in routine analytical procedures.

Also, employing diethyl ether as reaction medium and triphenylphosphine oxide, in reaction with butyllithium, there is obtained a 1-(diphenylphosphinyl)butyllithium product. In appearance, the product is dark red-orange in solution.

Also, when employing triphenylphosphine oxide and pentyllithium in ether, there is obtained a 1-(diphenylphosphinyl)pentyllithium product.

Also, when employing a tri(1-naphthyl)phosphine oxide and methyllithium, there is obtained a di(1-naphthyl)phosphinylmethyllithium product, and, naphthalene of reaction.

Similarly, when employing tri(2-naphthyl)phosphine oxide, and n-butyllithium, there is obtained a 1-(di-(2-naphthyl)phosphinyl)butyllithium product and naphthalene of reaction.

Also, employing tetrahydrofuran as reaction medium, and tris(m-methoxyphenyl)phosphine oxide and octyllithium there is obtained a 1-(bis(m-methoxyphenyl)-phosphinyl)octyllithium product and methylphenyl ether of reaction.

Also, employing tris(o - (methoxy)phenyl)phosphine sulfide and methylmagnesium chloride there is obtained a bis(o - (methoxyphenyl)phosphinothioylmethylmagnesium chloride and methyl phenyl ether of reaction.

Also, employing tris(o-(butoxy)phenyl)phosphine oxide, and propyllithium, there is obtained a 1(bis(o-(butoxy)phenyl)phosphinyl)propyllithium product phenyl ether of reaction.

Also, employing tris(m-tolyl)phosphine sulfide and butylmagnesium bromide, there is obtained a (bis(m-tolyl)phosphinyl)butylmagnesium bromide and toluene of reaction.

Also, employing tris(2,4-ditertiarybutylphenyl)phosphine oxide and methyllithium, there is obtained a bis (2,4-ditertiarybutylphenyl)phosphinylmethyllithium product and 1,3-ditertiarybutylbenzene of reaction.

Also, employing tris(p - nitrophenyl)phosphine, selenide, and ethylmagnesium iodide there is obtained a 1(bis(p - nitrophenyl)phosphinoselenoyl)ethylmagnesium iodide and nitrobenzene of reaction.

Also, employing tris(p-nitrophenyl)phosphine oxide and methyllithium there is obtained a bis(p-nitrophenyl)phosphinylmethyllithium and nitrobenzene of reaction.

Also, employing tris(m-(methylsulfonyl)phenyl)phosphine sulfide and methyllithium there is obtained a bis (m - (methylsulfonyl)phenyl)phosphinothioylmethyllithium and methylphenyl sulfone of reaction.

Also, when employing the para-isomer of the above starting material, namely tris(p-(methylsulfonyl)phenyl) phosphine sulfide and methyllithium there is obtained a bis(p - (methylsulfonyl)phenyl)phosphinothioylmethyllithium and methylphenyl sulfone of reaction. It is to be noted that when there is a single ring substituent in the aryl ring of the starting tris aryl phosphine chalkogenide, its starting isomeric position is without effect upon the identity of the resulting by-product.

Also, employing tris(m-biphenylyl)phosphine oxide and methyllithium there is obtained a bis(m-biphenylyl) phosphinylmethyllithium and biphenyl of reaction.

EXAMPLE 3–A

A Grignard reagent, in the solution in which it was prepared, is essentially the equivalent of a lithioalkyl reagent in the instant aspect of the present invention. The Grignard reagent can be any loweralkyl magnesium halide whereof the halogen is chloro, bromo, or iodo and loweralkyl is as hereinbefore defined.

In a representative operation, monobromomethane and magnesium are reacted in equimolecular amounts in tetrahydrofuran to obtain methyl magnesium bromide. This is then reacted, in situ, with triphenylphosphine oxide. The reaction follows the equation

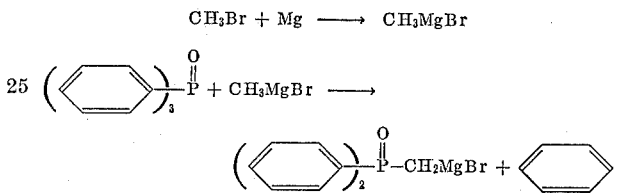

This intermediate substance, [(diphenylphosphinyl) methyl]magnesium bromide undergoes the typical Grignard reactions and thus makes possible the synthesis of useful derivatives of a wide range. Also, by reason of its reactivity, the said intermediate is useful as a scavenging agent for reactive gases.

More particularly, methyl bromide is chilled with solid carbon dioxide and 1 gram (0.01 mole) is added, as a volatile liquid, to cold, freshly distilled tetrahydrofuran (50 milliliters) containing 0.25 gram (0.01 gram-atom) metallic magnesium turnings. The methyl bromide and magnesium promptly react, with darkening of color, to form approximately 0.01 gram mole (1.19 grams) methyl magnesium bromide.

To the resulting mixture is added, with mixing and stirring, at room temperature, a dispersion of triphenylphosphine oxide (2.78 grams, 0.01 gram mole) in 50 milliliters tetrahydrofuran. The resulting mixture, under nitrogen blanket, is heated to the reflux temperature, and maintained thereat for a period of time (about an hour) to carry the reaction to completion. As a result of these operations there is obtained about 0.01 gram mole (3.1 grams) ((diphenylphosphinyl)methyl)magnesium bromide. The identity of the product compound is verified by the reaction of a portion of it with water, according to the equation

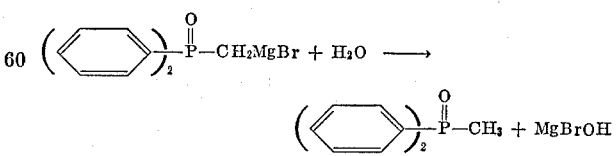

to obtain a diphenylphosphinylmethane product. The basic magnesium bromide precipitates and the precipitate is soluble in dilute hydrobromic acid.

EXAMPLE 4

Employing triphenylphosphine selenide (Justus Liebig's Annallen der Chemie, volume 229, page 295 and following, 1885) and methyllithium there is obtained a diphenylphosphinoselenoylmethyllithium product which is also sometimes called (lithiomethyl)diphenylphosphine selenide. The preparation is carried out in tetrahydrofuran. The reaction is represented by the equation

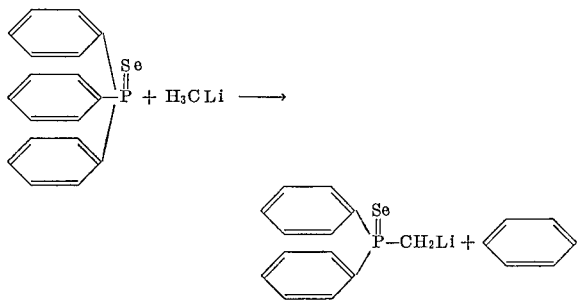

The compound reacts with hydrobromic acid to obtain methyldiphenylphosphine selenide and lithium bromide:

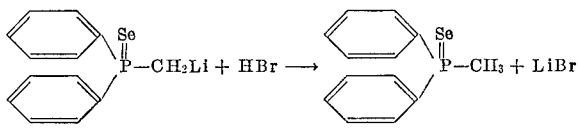

Anhydrous diethyl ether is added to the resulting mixture to precipitate lithium bromide completely, and obtain an organic solution. Vapor phase chromatography of the organic mixture demonstrates benzene of reaction and methyldiphenylphosphine selenide as product. Benzene, methyldiphenylphosphine selenide, and lithium bromide are assayed and reaction products found to represent about 80 percent conversion of starting triphenylphosphine selenide.

The diphenylphosphinoselenoylmethyllithium product is highly reactive and is advantageously held in the reaction mixture in which prepared, dry, and under dry nitrogen blanket.

The various triarylphosphine chalkogenides and their ring-substituted derivatives, are prepared, if desired, in the manner described in the Dombrowsky Memorial Bulletin of the Academy of Military Technology, Warsaw, 10, number 4, pages 34–38, by Wroblowa and Okon.

The foregoing substances are of use chiefly as intermediates, by reason of their extreme reactivity and its localization at the lithium atom or halometallic site. They have, in addition, value as air or moisture activated hypergolic agents and as components of explosives. Also, they are useful in scavenging, that is removing reactive gases, such as oxygen, and water vapor, from confined spaces, by reaction with such gas.

However, employing the reactivity of the lithiated or halometallic site with a halogen compound, it becomes possible, through the employing of the substances foregoing as intermediates, to synthesize novel compounds of a broad scope.

Metathesis occurs between the Grignard or lithioalkyl diarylphosphine chalkogenide, at the Grignard or lithiated site, and, at its halogenated site, an organic halide substance containing halogen selected from chlorine, bromine, and iodine and bonded to an element that is of Groups IV–A and V–A of the Periodic Table, is isoelectronic with one of helium, neon, argon, krypton, and xenon, and selected from the group consisting of carbon, phosphorus, silicon, and tin. The said elements are polyvalent, and valences of the said elements not occupied by halogen can be occupied by organic radicals, as further defined below.

The expression "isoelectronic" as employed herein to set forth the relationship between related elements of groups of elements is employed in its strict and classic sense, as defined in the McGraw-Hill Encyclopedia of Science and Technology (McGraw-Hill, N.Y.), volume 7 (1960), page 276, the entry "isoelectronic sequence."

Of the numerous metathesis product compounds that are thus brought into view, those of the greatest present interest are the compounds wherein the organic halide starting material contains halogen bonded to one of the polyvalent elements carbon, phosphorus, silicon, and tin, there being other substituents, hereinafter designated E, sufficient to occupy all valences of said polyvalent element and selected from the group consisting of divalent oxygen, divalent sulfur, and organic radicals bonded also to the said polyvalent element, directly or through divalent oxygen or sulfur, the said organic radicals being acyclic aliphatic of up to and including 20 carbon atoms, aromatic radicals of up to and including 20 carbon atoms including the carbon atoms of carbon-containing substituents, cycloaliphatic of up to and including 6 ring atoms, heterocyclic radicals of up to and including 6 ring atoms and of those 6, up to 3 being oxygen, all other ring atoms being carbon, all substituents upon any of said aliphatic, aromatic, or heterocyclic nuclei being selected from the group consisting of loweralkoxy, loweralkylsulfonyl, nitro fluoro, chloro, phenyl and substituted phenyl whereof the substituents are of the group above identified.

The aromatic and heterocyclic radicals can also contain loweralkyl substituents: the presence of such moieties upon the alkyl substituents is within the scope of the alkyl radicals as hereinbefore defined.

Chemists will immediately recognize that a halogenated starting material may contain more than one site bearing a halogen atom whereby it can function as a starting material in the instant aspect of the present invention. Such polyfunctional starting materials can react with a plurality of molecules of lithium-containing compound of the sort hereinbefore set forth, giving rise thereby to polykis product compounds.

An equation representative of the instant aspect of the present invention, employing a lithium compound of the sort hereinbefore set forth and, as halogenated reactant, a general halide, to obtain a metathesis product is as follows:

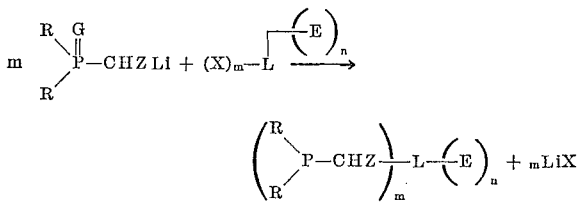

wherein R has the values hereinbefore defined, X is halogent, L is carbon, phosphorus, silicon or tin, and $m$ and $n$ are such integers that the valence total of X and E thus designated is the valence of L; and E is a substituent group as hereinbefore defined.

The reaction between the lithium compound of the type set forth foregoing and the halogen-bearing compound goes forward when the substances are contacted together at a temperature of from $-50°$ C. to $+150°$ C. and in any relative amounts. The reaction takes place readily at room temperature and with good yields, in inert liquid reaction medium. Representative reaction media are those employed foregoing in the production of the lithium compounds. When desired, the said lithium compound may be prepared and employed in situ by the addition thereto of the halogen bearing compound or a solution of it, to go forward to the production of products of this aspect of the present invention. The lithium compound and a mono halogen-bearing compound are consumed in equimolecular amounts and can conveniently be supplied in these amounts. The stoichiometry of reactions with polyhalo compounds will be apparent. Because the halogen-bearing compound tends to be more stable than the lithium containing reactant, and is more readily separated and recovered for later re-use, if either principal reactant is to be employed in excess it will usually be preferred to employ the halogen-bearing compound in excess.

In view of the liability of the lithium compound, the reaction of the present aspect of the invention is desirably carried out, as were the foregoing aspects, in the absence of undesired reactive substances, notably water and air, and under inert gas blanket which may be nitrogen blanket. Also, reactants to be employed should be, preferably, free of water and other undesired side-reactant substances; and their solutions can desirably be purged with nitrogen or other inert gas before employment. The importance of these considerations will be governed by the importance of avoiding loss of reactant substance in undesired side reactions.

Depending upon the precise identity of the reactant substances employed, and in particular upon the identity of the halogen and similar factors, it may be desired to carry out the present reaction with external cooling, whereby to remove heat of reaction; also, the reactants can be combined slowly, portionwise, and with stirring to avoid sudden release of heat in large amounts. These procedures make convenient the employment of solvents otherwise too volatile for safe use.

The preparation of intermediates of the Grignard type, and their uses, are almost exactly analogous to those set forth hereinbefore for the lithium compounds. As noted, the organic halide reactant compounds are of the same scope, and products are the same, there being minor differences in speed of reaction, occasionally in choice of solvent, and in identity of byproduct substance. While the lithium compound prepares a lithium halide of reaction, the Grignard type compound typically prepares a magnesium halide of reaction. Stoichiometry of the reaction is the same. Similar measures are indicated by reason of the lability of the Grignard type compounds.

The present aspect of this invention will be more fully understood and can be practiced by those skilled in the art by reference to the following examples, which set forth the best method of practice of the invention now known.

EXAMPLE 5

In the present example, the intermediate product substance of Example 1, namely (diphenylphosphinylmethyl)lithium is reacted with diphenylphosphinous chloride. The reaction is represented by the following equation

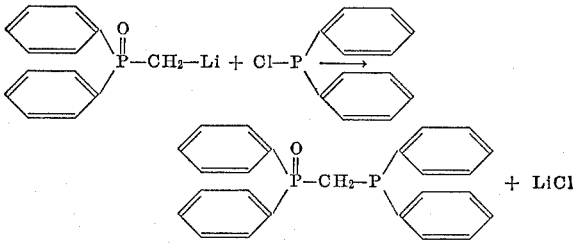

In this example, the halogenated compound is diphenylphosphinous chloride: of it, the halogen is chlorine, the element isoelectronic with argon is phosphorus and of the organic substituents there are two and they are aromatic radicals of 6 carbon atoms each, namely phenyl groups. The procedure is as follows:

Dry diphenylphosphinous chloride, 11 grams (0.05 mole) dispersed in dry, diethyl ether and thereafter nitrogen purged is added slowly, portionwise, and with continuous stirring at room temperature through nitrogen blanket to a dark, red-orange dispersion of 11.1 grams (0.05 mole) of (diphenylphosphinylmethyl)lithium product of Example 1, foregoing.

During the course of the addition, a hypsochromic color change takes place in the resulting solution, from its initial deep orange-red to essentially colorless. The lithium of the (diphenylphosphinylmethyl)lithium and the chlorine of the diphenylphosphinous chloride combine metathetically to obtain lithium chloride, of low solubility in diethyl ether, and the remaining moieties combine, also metathetically, to obtain a (diphenylphosphinylmethyl)-diphenylphosphine product. Upon evaporation and removal of ether solvent, and recrystallization from benezene-hexane, the said product is obtained as a white, crystalline solid of molecular weight approximatly 400 as determined by mass spectrometer and yielding thereby moietal fragments appropriate to the assigned structure. The structure is confirmed by infrared spectrum.

All the products of the present aspect of this invention are readily prepared in procedural steps essentially identical with those foregoing; by the appropriate choice of halogenated and metal-organic starting materials whether containing lithium or magnesium halide, the desired products are readily obtained.

EXAMPLE 6

In the present example (lithiomethyl)diphenylphosphine selenide (7 grams, 0.05 mole), as prepared in Example 4, is reacted with diphenylphosphinous chloride (6.5 grams, 0.05 mole) to obtain a ((diphenylphosphino)-methyl)-diphenylphosphine selenide. The reaction produces also lithium chloride as by-product, and takes place according to the equation

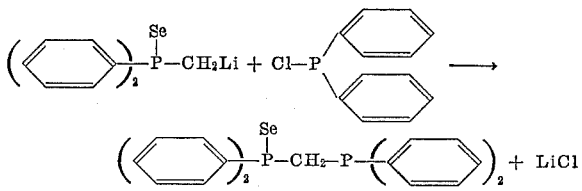

Conversion, which is apparently complete, is accompanied by a color change from the dark red-orange color of the starting lithiomethyl compound to colorless of the product. The product has a molecular weight of approximately 463.5, and yield is approximately 11.4 grams. The resulting product, unlike its starting substances, is stable in the presence of air and water. It is readily separated in crude form by vaporization and removal of liquid reaction medium. It is then taken up in water and filtered, whereby lithium chloride is removed and any unreacted starting lithiomethyl compound is destroyed. Filtration of the resulting suspension obtains a relatively pure product. The product is then taken up in and recrystallized from benzene and hexane.

EXAMPLE 7

In the present example, (lithiomethyl)di-1-naphthylphosphine oxide is reacted with di-2-naphthylphosphinous chloride. By reason of the steric bulk and weight of the naphthyl moiety, the reaction proceeds somewhat less vigorously than the reaction foregoing. The starting solution of lithiomethyl compound is of darker color. The resulting product is a colorless crystalline solid.

The reaction follows the equation

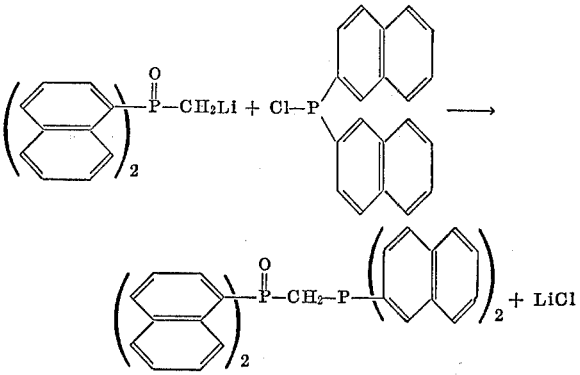

32.2 grams (0.1 mole) (lithiomethyl)di-1-napthylphosphine oxide and 32 grams (0.1 mole) di-2-naphthyl-phosphinous chloride dispersed separately in diethyl ether, nitrogen purged and blanketed, are combined slowly, dropwise, and with stirring, during two hours. From the original dark color of the lithiomethyl compound solution, color change occurs to obtain a product which is white in mass, colorless in solution. Conversion appears to be essentially complete and there are obtained approximately 58 grams of ((di-2-naphthylphosphino)methyl)di-1-naphthylphosphine oxide. The product is found, upon mass spectrometric analysis to have a molecular weight of approximately 600 and to yield moietal fragments appropriate to the assigned structure. The proportion of sample appearing as the approximately whole molecular weight indicates that the product is of good stability.

EXAMPLE 8

A diethyl ether solution, nitrogen purged and blanketed containing, in 250 milliliters, 12.8 grams (0.05 mole) (1-lithio-n-butyl)diphenylphosphine oxide is added slowly, dropwise, and with continuous stirring and external cooling to a diethyl ether dispersion of 8.8 grams (0.05 mole) bis(2-methylpropenyl)phosphinous chloride. The reaction follows the equation

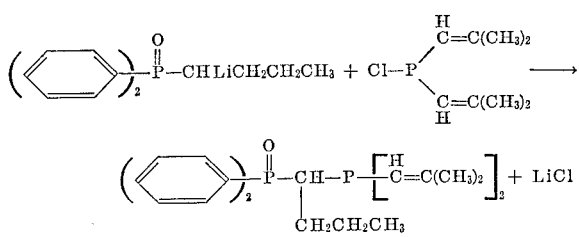

There are obtained approximately 11 grams (1-(bis(2-methylpropenyl)phosphino) - n-butyl)diphenylphosphine oxide.

The product is separated from solution and purified in known manner; it is dispersed in water and filtered to remove lithium chloride of reaction, dried, taken up in acetone and recrystallized therefrom. The product is a white crystalline solid of molecular weight approximately 235. (Formula weight, 236.516.)

EXAMPLE 9

Halogens of two different kinds appear in the halogenated reactant of the present example. The desired course of the reaction is assured by employing equimolecular amounts of reactant substances.

(1-lithioethyldiphenylphosphine oxide (12 grams, 0.05 mole) is reacted in the manner of the foregoing examples, with bis(2,4,5-trichlorophenyl)phosphinous bromide, (24 grams, 0.05 mole). The product is (1-(bis(2,4,5-trichlorophenyl)phosphino)ethyl)diphenylphosphine oxide; the reaction follows the equation

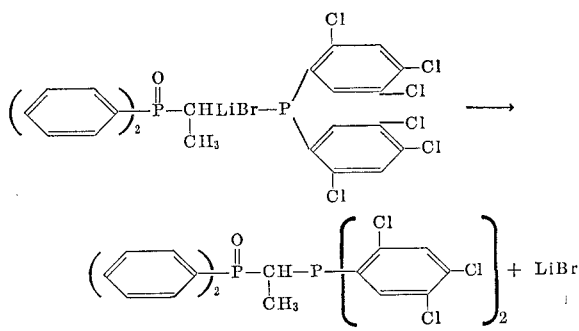

Not only by its identity, but by reason of its attachment to the phosphorus, the bromine is more reactive than the ring-substituent chlorine atoms. Thus, with only moderate care, the reaction follows the indicated course.

EXAMPLE 10

The remarks foregoing pertaining to reactivity of the halogens pertain also to the present example. In this example, (lithiomethyl)diphenylphosphine oxide (11.1 grams 0.05 mole) is reacted with bis(dichloromethyl) phosphinous bromide (14 grams, 0.05 mole). The product is ((bis(dichloromethyl) phosphino) methyl)diphenylphosphine oxide. The reaction follows the equation

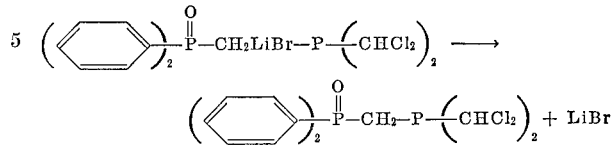

In the present example as in those foregoing, the starting lithium compound is dark red-orange in solution and the reaction of the present example is accompanied by a color change to obtain a product which is white in mass, colorless in individual crystals or in solution.

It is to be expected that the aliphatic chlorine of the halogenated starting reactant is somewhat more reactive than the aromatic substituent chlorine in the examples foregoing; however, by employment of equimolecular amounts of reactants, both reactants appear to be consumed completely and the halide of reaction to be essentially pure bromide: mass spectrum confirms the product assigned structure and molecular weight.

EXAMPLE 11

By reacting of triphenylphosphine sulfide and butylmagnesium bromide in tetrahydrofuran, with prior nitrogen purge and under nitrogen blanket and in the absence of water, there is produced a (1-(diphenylphosphinothioyl) butyl)magnesium bromide. This substance is employed, in situ, by reaction with diphenylphosphinous bromide to obtain a (1-(diphenylphosphino)-n-butyl)diphenylphosphine sulfide. The reaction to prepare the ultimate product follows the equation

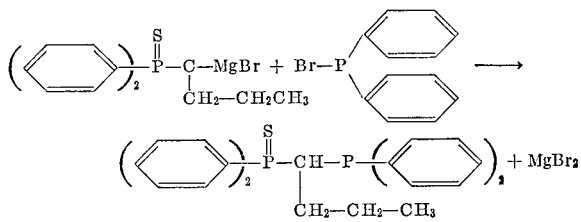

From 29 grams, approximately 0.1 mole, triphenylphosphine sulfide by reaction with an aquimolecular amount of butylmagnesium bromide there is obtained approximately 37.7 grams (1-(diphenylphosphinothioyl)butyl)magnesium bromide. This substance together with benzene of reaction permitted to remain in situ is then caused to react with diphenylphosphinous bromide dissolved in diethyl ether. The said bromide is added slowly, dropwise, and with continuous stirring and external cooling, over a period of 1 hour, to supply a total amount of 26.5 grams, 0.1 mole. During the addition, the original dark color of the Grignard compound solution becomes lighter and eventually the resulting solution is nearly colorless. The resulting product solution is heated to vaporize and remove reaction medium and taken up in water to remove magnesium bromide of reaction and obtain, essentially pure, approximately 40 grams 1-(diphenylphosphino)-1-(diphenylphosphinothioyl)-n-butane. The identical substance is also called (1-(diphenylphosphino)-n-butyl)-diphenylphosphine sulfide.

EXAMPLE 12

Because the present reaction takes place exclusively between the metal-bearing site and, in the present invention, an active halogen, it is immaterial to the course of the reaction what other substituents, so long as not of competitive activity, may be present. Thus, heterocyclic substituted compounds of a great variety are available and can be reacted. In the present example, (1(bis(o-butoxyphenyl)phosphinyl)propyl)magnesium bromide oxide is reacted with bis(p-dioxanyl)phosphinous bromide. The reaction follows the expected course. The reaction is represented by the following equation

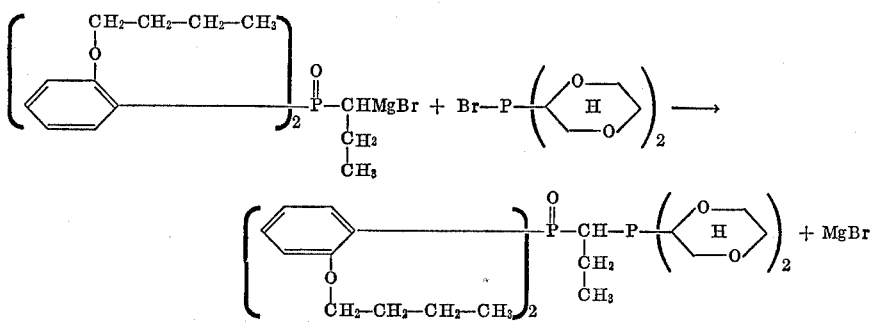

More particularly, 23.3 grams (0.05 mole) (1-(bis(o-butoxyphenyl)phosphinyl)propyl)magnesium bromide in diethyl ether wherein it was prepared is reacted with 14.35 grams (0.05 mole) bis(p-dioxanyl)phosphinous bromide also in diethyl ether, both nitrogen purged and nitrogen blanketed during the reaction, to obtain approximately 50 grams (1-(bis(p-dioxanyl)phosphino)-n-propyl)bis(o-butoxyphenyl)phosphine oxide.

EXAMPLE 13

Essentially the same procedures as the foregoing are employed in the preparation represented by the following equation

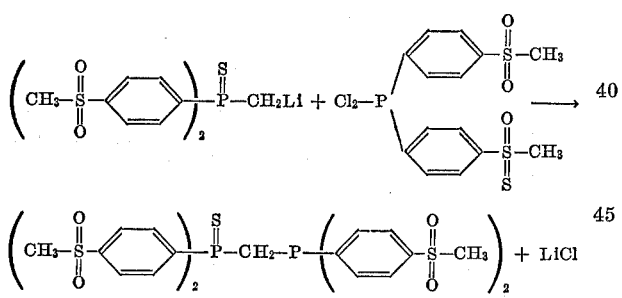

More particularly, 20 grams (slightly more than 0.05 mole) (lithiomethyl)bis(p-(methylsulfonyl)phenyl)phosphine sulfide is combined with 19 grams (slightly less than 0.05 mole) of bis(p-(methylsulfonyl)phenylphosphinous chloride. Both substances are dispersed in dry tetrahydrofuran, the dispersions first nitrogen purged and the combination taking place slowly, portionwise, and with continuous stirring and external cooling during approximately a half hour and under nitrogen blanket. The originally dark color of the lithium compound becomes lighter through the course of the reaction and eventually the resulting mixture is nearly colorless. As a result of these procedures, there is obtained approximately 34 grams ((bis(p-(methylsulfonyl)phenyl)phosphinyl)methyl)bis(p-(methylsulfonyl)phenyl)phosphine sulfide.

EXAMPLE 14

In the present example the halogenated reactant contains chlorine as both ring substituent and upon the phosphorus atom. The latter is substantially the more reactive and essentially pure desired product is obtained if the reactants are supplied in essentially equimolecular amounts and the reaction mixture prevented from becoming excessively heated. The reaction of the present examples is represented by the equation

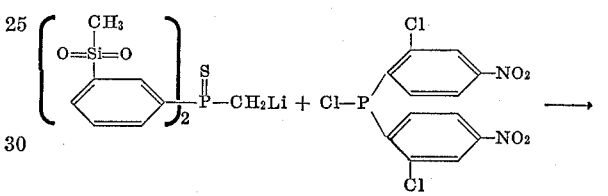

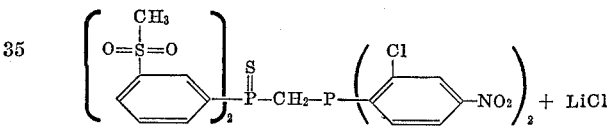

More particularly, 19.7 grams (0.05 mole) (lithiomethyl)bis(m - (methylsulfonyl)phenyl)phosphine sulfide dispersed in tetrahydrofuran is dried over anhydrous calcium sulfate, filtered, nitrogen purged, and, to it under nitrogen blanket and with external cooling and continuous stirring there is added a dried, nitrogen purged, nitrogen blanketed tetrahydrofuran dispersion containing 19 grams (approximately 0.05 mole) bis(2-chloro-4-nitrophenyl) phosphinous chloride. During the addition, reaction occurs evolving heat which is conveyed away by an ice-water bath, to obtain approximately 30 grams ((bis(2-chloro - 4 - nitrophenyl)phosphino)methyl)bis(m-(methylsulfonyl)-phenyl)phosphine sulfide. The product is purified by water washing to remove lithium chloride of reaction.

Mass spectrometric analysis establishes a molecular weight of slightly higher than 703 and establishes the presence and relative abundance of moieties appropriate to the assigned structure.

EXAMPLE 15

Tris(p-ethylphenyl)phosphine selenide (Annalen, volume 229, page 295 and following) is reacted with ethyl magnesium bromide to obtain (1 - (bis(p - ethylphenyl) phosphinoselenoyl)ethyl)magnesium bromide in the manner described earlier in the present specification. This substance is retained in situ and is thereafter reacted with dicyclopropylphosphinous bromide. Routinely, all reactant dispersions are dried, nitrogen purged, and the reaction carried out under nitrogen blanket and with external cooling and stirring as the reactants are combined slowly and portionwise. The present reaction follows the equation

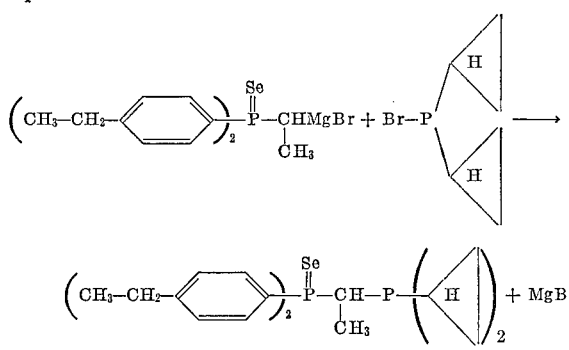

45.2 grams (0.1 mole) (1 - (bis(p - ethylphenyl)phosphinoselenoyl)ethyl)magnesium bromide is reacted with 19.3 grams (0.1 mole) dicyclopropylphosphinous bromide. In the course of the reaction the color of the phosphinoselenoyl reactant becomes lighter and eventually essentially colorless, as there is produced a (1-(dicyclopropylphosphino)ethyl)bis(p-ethylphenyl)-phosphine selenide product. The yield is approximately 40 grams. This represents slightly less than 0.1 mole. Mass spectrometric analysis establishes a molecular weight of approximately 465 for the product and the infrared spectrum shows nothing inconsistent with the assigned structure.

EXAMPLE 16

In the present example, because the halogenated reactant contains halogen at more than one site, to avoid formation of undesired side products, it is important that starting materials be employed in equimolecular weights. As would be expected, chlorine bonded to a phosphorus atom which in turn is also bonded to bivalent oxygen reacts more readily than does chlorine bonded to a heterocyclic aliphatic ring. The present reaction is represented by the following equation

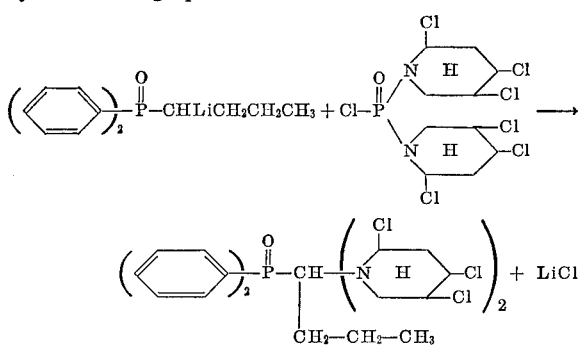

More particularly, bis(2,4,5-trichloropiperidino)-phosphinic chloride in ethereal solution, dried, nitrogen purged and nitrogen blanketed is added slowly, dropwise, and with continuous stirring through nitrogen blanket to an ethereal dispersion of (1-lithio-n-butyl)diphenylphosphine oxide dispersed also in diethyl ether, dried, and under nitrogen blanket. The reaction takes place during approximately an hour during which time heat of reaction is removed by external cooling in an ice and water bath. Upon completion of the reaction, ether solvent is vaporized and removed, the resulting product taken up in water and filtered to remove lithium chloride of reaction and obtain a relatively pure 1-(diphenylphosphinyl)-1-(bis(2,4,5-trichloropiperidino)phosphinyl)-n-butane. The product occurs as essentially colorless crystals and upon mass spectrometric analysis is found to have a molecular weight of 680, with a possible error tolerance of three mass units plus or minus; moietal fragments of molecular weights appropriate to the assigned structure occur in the resulting spectrum and nothing in the infrared spectrum is inconsistent therewith.

EXAMPLE 17

In the present example, cyclohexylmethylphosphinic chloride is reacted with (1-lithiomethyl)di-1-naphthylphosphine oxide. This phosphine oxide compound is produced in situ by the reaction of methyllithium with tri-1-naphthyl phosphine oxide. The reaction follows the equation

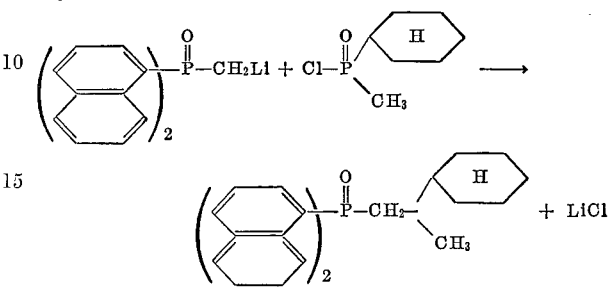

More particularly, a dispersion in diethyl ether of cyclohexylmethylphosphinic chloride is dehydrated and nitrogen purged and held under nitrogen blanket pending use. This dispersion is added slowly, dropwise, with continuous stirring and external cooling to an ethereal dispersion of (1-lithiomethyl)di-1-naphthylphosphine oxide. 9 grams of the cyclohexylmethylphosphinic chloride are caused to react with 16.11 grams of the lithiomethyl compound. In the course of the reaction heat is evolved and removed and the color of the lithiomethyl reactant turns from dark red-brown to essentially colorless. There are obtained in this reaction approximately 20 grams (somewhat less than 0.01 mole) (di-1-naphthylphosphinyl) (cyclohexylmethylphosphinyl)methane. After benzene and water washing, mass spectrometric analysis shows a molecular weight of 460, with possible error of one mass unit above or below. Further aspects of the mass spectrum together with the infrared spectrum confirm the assigned structure. This substance is a white crystalline solid.

EXAMPLE 18

In procedures essentially the same as those foregoing, bis(p-nitrophenyl)phosphinylthioic bromide (19.3 grams, 0.05 mole) in ethylene glycol dimethyl ether dispersion is added slowly, dropwise, and with continuous stirring to 15.6 grams (0.05 mole) (1-lithiomethyl)bis(p-nitrophenyl)phosphine oxide, also dispersed in ethylene glycol dimethyl ether, both substances dried and nitrogen purged and under nitrogen blanket, the reaction being caused to take place with continuous stirring and external cooling. Upon completion of the reaction, the resulting mixture is dispersed in water whereupon the desired product separates out and is removed by filtration. It is further water washed and dried to obtain a (bis(p-nitrophenyl) phosphinyl)(bis(p - nitrophenyl)phosphinylthioyl)methane product. The mass spectrum of the product indicates a molecular weight of 611 plus or minus two mass units, further portions of the mass spectrum and an infrared spectrum tend to confirm the assigned structure.

The synthesis of the present example follows the equation

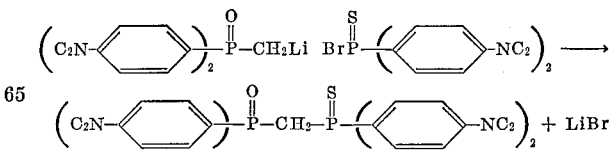

EXAMPLE 19

In manner similar to the foregoing, 25.8 grams (0.05 mole) bis(p-phenylsulfonyl)phenylphosphinic chloride dispersed in dioxane is added slowly, portionwise, and with stirring to a diethyl ether dispersion of 18.2 grams (1-lithio-n-butyl)di-2-naphthylphosphine oxide. The reactants and the fluids in which they are dispersed are dry, nitrogen purged and nitrogen blanketed, and then addition is carried out under nitrogen blanket and with continous stirring and external cooling. The reaction takes place according to the equation

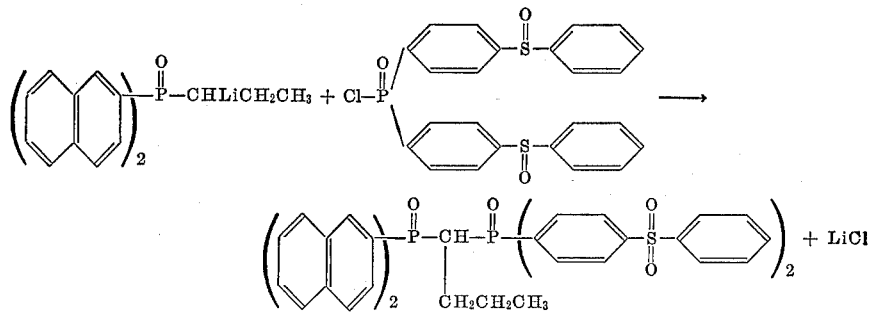

As a result of these procedures there is obtained a 1-(di - 2 - naphthylphosphinyl)-1-(bis(p-phenylsulfonyl)-phenyl)phosphinyl) - n - butane. The assigned formula weight is 838.930. This is greater than the highest weights which can be directly scanned in the mass spectrometer routinely used. However, an authentic sample is available of the bis(p - hydroxybenzoyl)disulfide diester of stearic acid; this substance has a molecular weight of 939.3. By the simultaneous introduction of the two substances into the spectrometer, and a comparison of the resulting spectra, it is ascertained that the molecular weight of the product of the present example does not differ by more than two mass units from that of the reference stearic acid diester.

Nothing in the infrared spectrum tends to contradict the assigned structure.

EXAMPLE 20

In the present example, didodecyl phosphorobromidate is caused to react with (1-lithio-n-butyl)diphenylphosphine sulfide. The reaction is carried out in dioxane. More particularly, 14 grams (0.05 mole) (1-lithio-n-butyl)-diphenylphosphine sulfide in the dioxane mixture in which it was prepared (250 milliliters) together with benzene (0.05 mole) of reaction is chilled over an ice bath and under nitrogen blanket. The liquid dispersion is added slowly, dropwise, and with continuous stirring to a dioxane dispersion of 24.9 grams, 0.05 mole (didodecyl phosphorobromidate also chilled over an ice bath, maintained under nitrogen blanket and under anhydrous conditions. The reaction proceeds according to the equation.

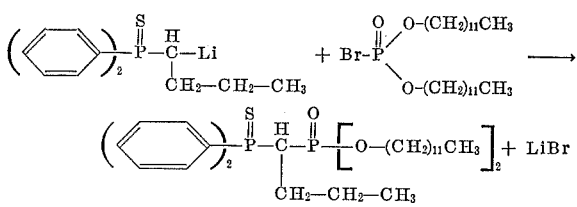

to obtain slightly less than 0.05 mole of 1-(diphenyl-phosphinothioyl) - 1 - (bis(dodecyloxy)phosphinyl)-n-butane. The compound has a formula weight of 691. After purification and water washing and drying in the manner hereinbefore described, the product of the present example is found by mass spectrum analysis to have a molecular weight of 690 with a possible error of three mass units above or below. The product is a white crystalline solid.

EXAMPLE 21

In the present example, (bis(2-methoxy-4-nitrophenyl)phosphinothioyl)methyl magnesium chloride is caused to react with dimorpholino phosphorochloridate. The reaction follows the equation

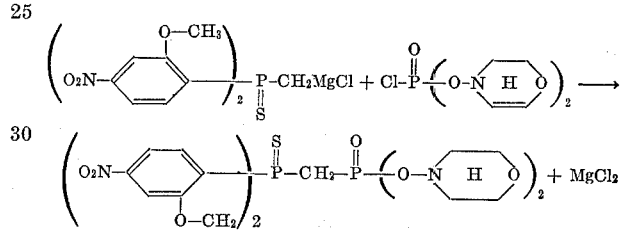

More particularly, 2.86 grams (0.01 mole) dimorpholino phosphorochloridate dispersed in 25 milliliters diethyl ether is added dropwise, slowly, and with continuous stirring to 4.4 grams (bis(2-methoxy-4-nitrophenyl)phosphinothioyl)methyl magnesium chloride dispersed in 250 milliliters diethyl ether and under nitrogen blanket.

In the ensuing reaction, the originally dark color of the Grignard compound becomes lighter and eventually disappears and there is produced a (bis(2-methoxy-4 - nitrophenyl)phosphinothioyl)(bis(morpholinooxy)-phosphinyl)methane product and magnesium chloride of reaction. The product has a formula weight of 632,541. Its molecular weight as determined by mass spectrum analysis is 630 plus or minus three mass units. Other aspects of the mass spectrum indicate moieties appropriate to the assigned structure. The product is a crystalline solid, white in mass and colorless in solution or as individual crystals.

EXAMPLE 22

In the present example, (bis(p-phenoxyphenyl)-phosphinothioyl)methyl magnesium chloride is reacted with an equimolecular amount of chlorothioacetyl chloride. Because chlorine occurs in two positions on the chlorothioacetyl chloride molecule, conceivably the employment of an excess of the Grignard alkyl compound might result in undesired side reactions. By the employment of an amount strictly equimolecular and maintaining reaction conditions at low temperature, the predominant reaction is the desired reaction of the present invention, between the alkyl magnesuim chloride and that chlorine bonded to thiocarbonyl carbon.

More particularly, 4.75 grams (0.01 mole) (bis(p-phenoxyphenyl)phosphinothioyl)methyl magnesium chloride and 1.3 grams (0.01 mole) chlorothioacetyl chloride are combined, the latter added slowly, portionwise, and with stirring to the former, each dispersed in 50 milliliters anhydrous diethyl ether, chilled and under nitrogen blanket and the reaction vessel further maintained in an ice and water bath. The addition of the reactant is carried out over a period of approximately 20 minutes. The reaction follows the equation

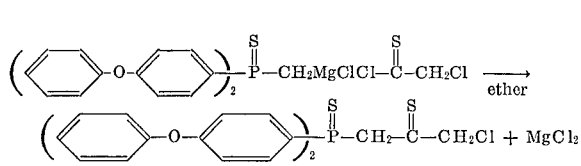

As a result of this operation, there is obtained slightly less than 0.01 mole ((chlorothioacetyl)-methyl)bis(p-phenoxyphenyl) phosphine sulfide. The mass spectrum of the resulting product indicates that it has a molecular weight of 510 plus or minus two mass units. The formula weight is 509.037. Further portions of the mass spectrum indicate the presence and relative abundance of moieties that would be expected from the assigned structure of the molecule.

EXAMPLE 23

The present example proceeds according to the equation

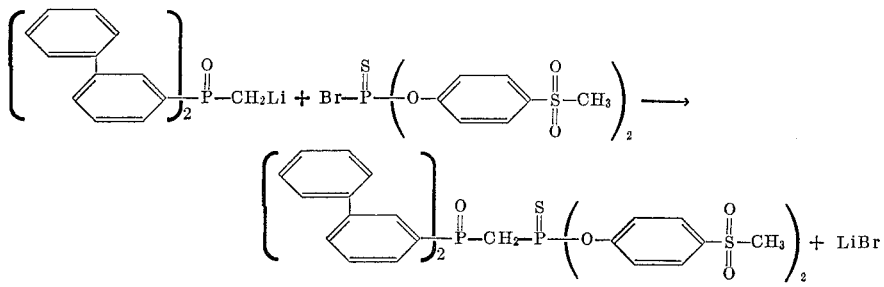

More particularly, 4.85 grams (0.01 mole) bis(p-methylsulfonyl)phenyl) phosphorobromidothioate dispersed in 50 milliliters diethyl ether is dehydrated, chilled, nitrogen purged and dispensed from beneath nitrogen blanket, dropwise, into a dispersion of 3.74 grams (0.01 mole) of (lithiomethyl)bis(m-biphenyly)phosphine oxide in 250 milliliters anhydrous diethyl ether which has been nitrogen purged and nitrogen blanketed. The addition takes place, with almost instantaneous reaction, during approximately 1 hour.

The originally dark color of the ether dispersion of (lithiomethyl)bis(m-diphenylyl)phosphine oxide becomes lighter continuously through the course of reaction, and eventually the resulting mixture is essentially colorless. As a result of these operations, there is obtained a product which is purified by vaporizing and removing diethyl ether, dispersing the resulting solid in water, washing with further water, and drying. This product is analyzed by mass spectrum and found to contain a major product component of molecular weight of 775 plus or minus three mass units. Infrared spectrum confirms the assigned structure that the product is (bis(m-biphenylyl)-phosphinyl)(bis)p - (methylsulfonyl)phenoxy)phosphinothioyl)-methane.

EXAMPLE 24

Compounds prepared according to the present invention are derived from halosilicon compounds as readily as from compounds of many other sorts; thus the method of the present invention substantially extends the range of compounds in view containing both phosphorus and silicon.

The present example proceeds according to the equation

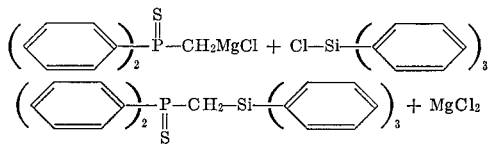

More particularly, 2.9 grams, 0.01 mole triphenylsilicon chloride dispersed in 50 milliliters anhydrous deithyl ether under nitrogen blanket and with nitrogen purge is added slowly, portionwise, through nitrogen blanket to a dispersion in 250 milliliters diethyl ether of 2.9 grams ((diphenylphosphinothioyl)-methyl) magnesium chloride, with continuous mixing and stirring over a period of approximately one half hour. As a result of these operations, there is obtained a diethyl ether dispersion of ((triphenylsilyl)methyl)diphenyl phosphine sulfide. Diethyl ether containing small amounts of benzene of reaction is vaporized and removed. The resulting product is washed and ethanol, and with water to obtain approximately 4.5 grams (somewhat less than 0.01 mole) of the said product. The product is a white crystalline solid, having a molecular weight upon mass spectrum analysis of 490 plus or minus three mass units. Further portions of the mass spectrum indicate the presence of moietal fragments the weights of which correspond to those expected from the assigned structure.

EXAMPLE 25

In the present example, methoxyethoxy n-butylsilicon chloride is caused to react with ((diphenyl-phosphinothioyl)methyl)magnesium chloride. The reaction follows the equation

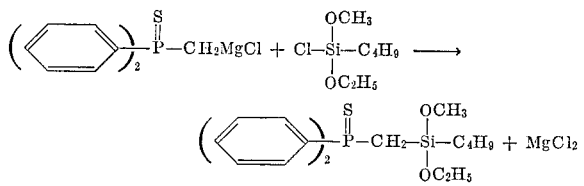

In particular, 2 grams (0.01 mole) methoxyethoxy n-butylsilicon chloride dispersed in 50 milliliters anhydrous diethyl ether first nitrogen purged and thereafter maintained under nitrogen blanket is added dropwise, through nitrogen blanket, to a dispersion of 2.91 grams (0.01 mole) of ((diphenylphosphinothioyl)methyl) magnesium chloride in 250 milliliters anhydrous nitrogen-purged diethyl ether also under nitrogen blanket and continuously stirred. The addition of the silicon chloride reactant takes place during approximately a half hour. Reaction between the reactants occurs almost immediately upon their combination. As a result of these operations, there is obtained approximately 3.6 grams (approximately 0.01 mole) of ((methoxyethoxy-n-butylsilyl)-methyl)diphenyl phosphine sulfide.

Upon the completion of the reaction, the diethyl ether solvent is vaporized and removed, the resulting product is washed with a small portion of ethanol, and thereafter with generous portions of water, and is air dried. The infrared spectrum is consistent with the assigned structure, and the molecular weight of approximately 392.6 is confirmed by mass spectrum analysis.

EXAMPLE 26

The present example goes forward according to the equation

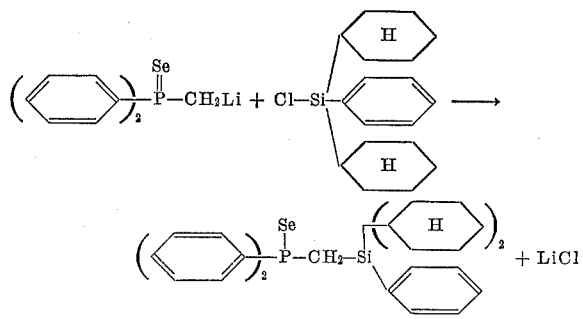

More particularly, 3 grams, 0.01 mole dicyclohexylphenylsilicon chloride dispersed in 50 milliliters anhydrous diethyl ether is added slowly, dropwise, over a period of about a half hour to 2.85 grams (0.01 mole) of (lithiomethyl)diphenylphosphine selenide, dispersed in 250 milliliters anhydrous diethyl ether, nitrogen purged and under nitrogen blanket.

As a result of these operations there is obtained approximately 5 grams (slightly less than 0.01 mole) of ((dicyclohexylphenylsilyl)methyl)diphenylphosphine selenide. The product is purified by vaporization and removal of diethyl ether reactant. Nitrogen blanket being no longer necessary is removed by ventilation, the resulting product is taken up in water and water washed and thereafter filtered and permitted to become air dry. Mass spectrum confirms the formula weight of 549.678. The infrared spectrum is consistent with the assigned structure.

EXAMPLE 27

The present example proceeds according to the equation

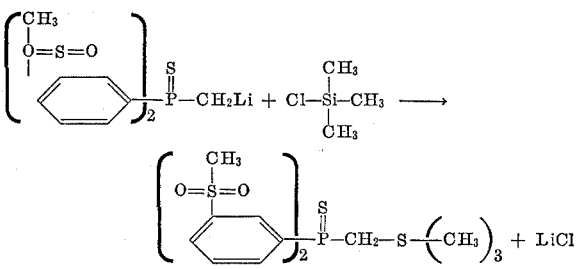

In particular, 1 gram (0.01 mole) trimethylsilicon chloride dispersed in anhydrous, nitrogen purged diethyl ether and held under nitrogen blanket is dropped through nitrogen blanket slowly, at room temperature, into 4.2 grams (0.01 mole) of (lithiomethyl)bis(m-(methyl-sulfonyl)phenyl)phosphine sulfide dispersed in 250 milliliters ice-cooled anhydrous nitrogen-purged diethyl ether under nitrogen blanket. The addition takes place with continuous stirring during about a half hour. Thereafter, nitrogen blanket is removed by ventilation, ether reaction medium is vaporized and removed and the resulting product is taken up in water and filtered, the residue being air-dired. The product is then washed with small portions of toluene, and again air-dried. As a result of these operations there is obtained a ((trimethylsilyl)-methyl)bis(m-(methylsulfonyl)phenyl)phosphine sulfide as a white crystalline product of molecular weight approximately 460.

EXAMPLE 28

In procedures essentially similar to the foregoing, dicyclohexylphenylsilicon chloride is reacted with (lithiomethyl)bis(p-(methylsulfonyl)phenyl)phosphine sulfide. The reaction follows the equation

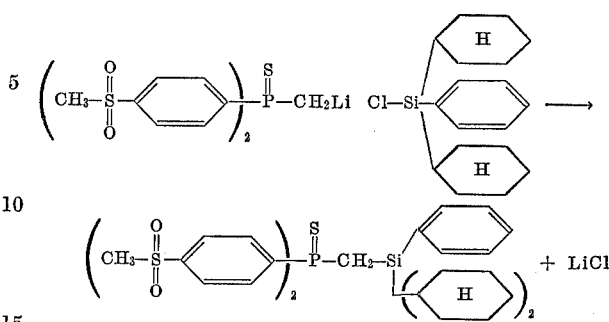

The reaction is carried out employing 0.01 molar amounts of the reactants, namely 3.95 grams of (lithiomethyl)bis((p - (methylsulfonyl)phenyl)phosphine sulfide, 3 grams dicyclohexylphenylsilicon chloride, and a total of 300 milliliters diethyl ether as reaction medium. The product obtained from these operations is ((dicyclohexylphenylsilyl)methyl)bis(p - (methylsulfonyl)phenyl)phosphine sulfide. There is obtained a yield of approximately 6 grams of the said product, and upon its being benzene washed and water washed and dried, its mass spectrum confirms the formula weight of 641, approximately.

EXAMPLE 29

In the present example, the halogenated reactant is triphenylsilicon chloride employed in 0.01 mole amount, namely 3 grams. The reaction follows the equation

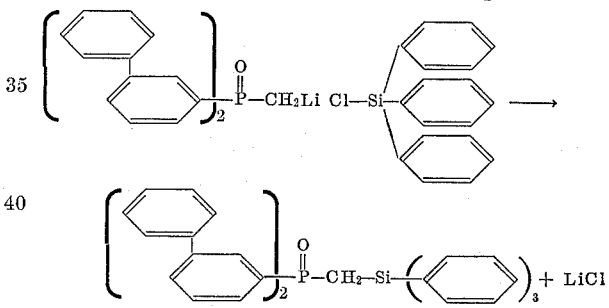

The triphenylsilicon chloride, dispersed in diethyl ether is added slowly, dropwise, through nitrogen blanket into a dispersion in 250 milliliters anhydrous nitrogen-purged diethyl ether of 3.75 grams (lithiomethyl)bis(m-biphenylyl)phosphine oxide chilled over an ice and water bath and with continuous stirring.

The resulting product is toluene washed and dried in vacuum oven and water washed and air dried to obtain a ((triphenylsilyl)methyl)bis(m - biphenylyl)phosphine oxide. The product has a molecular weight of 625 plus or minus two mass units.

EXAMPLE 30

Tin compounds react advantageously in the reaction of the present invention.

By the reaction of triphenylphosphine oxide with methyllithium there is obtained benzene of reaction and lithiomethyldiphenylphosphine oxide in situ. The reaction is carried out under nitrogen blanket under anhydrous conditions and with cooling. To the resulting lithiomethyldiphenylphosphine oxide is added triphenyltin chloride in equimolecular amount. As a result of these procedures there is obtained a white crystalline diphenyl(triphenylstannylmethyl)phosphine oxide. The reaction follows the equation

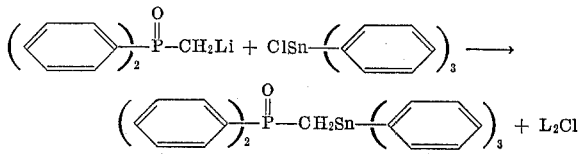

The identity of the product is confirmed by nuclear magnetic resonance spectrum.

EXAMPLE 31

In manner similar to the foregoing, triphenyltin bromide is reacted with (lithiomethyl)bis(p-(methylsulfonyl)phenyl)phosphine sulfide, employing 0.005 molar quantities. Thus, 2 grams of the phosphine sulfide compound are reacted with 2.1 grams of the triphenyltin bromide. As a result of these procedures there is obtained a ((triphenylstannyl)methyl)bis(p - (methylsulfonyl)phenyl)phosphine sulfide. The reaction follows the equation

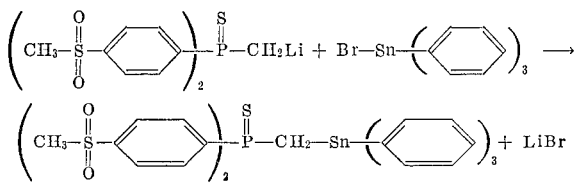

EXAMPLE 32

In the present example, di-4-pyridylphosphinous chloride is reacted in manner similar to the foregoing with ((diphenylphosphinothioyl)methyl) magnesium chloride. The reaction is carried out in 0.005 molar quantities and in diethyl ether. 1.45 grams of the Grignard reactant, and 1.1 grams of the pyridylphosphinous chloride are employed, and yield somewhat more than 1.8 grams of ((di-4-pyridylphosphino)methyl)diphenylphosphine sulfide as a white crystalline solid. The reaction follows the equation

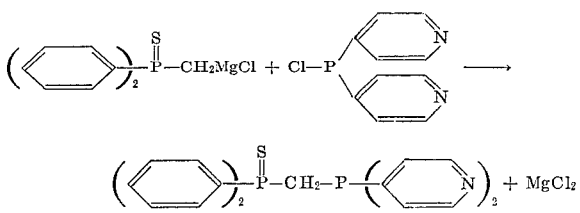

EXAMPLE 33

2.3 grams (0.01 mole) dicyclohexylphosphinous chloride dispersed in 50 milliliters anhydrous nitrogen-purged diethyl ether are added slowly, dropwise, and at room temperature to 2.8 grams (0.1 mole) (1-lithio-n-pentyl) diphenylphosphine oxide dispersed in 250 milliliters dry, nitrogen-purged diethyl ether chilled over an ice bath and continuously stirred during the addition. Addition requires approximately a half hour.

As a result of these procedures there is obtained a (1-dicyclohexylphosphino) - n - pentyl)diphenylphosphine oxide. Upon mass spectrum analysis the product is found to have a molecular weight of 469, plus or minus two mass units. The assigned structure is confirmed by infrared spectrum. The reaction follows the equation

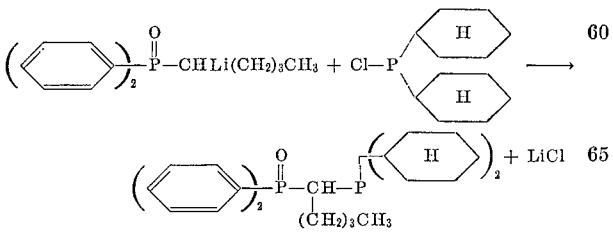

EXAMPLE 34

Methyldifluorosilicon chloride reacts in the manner of the present invention by metathesis with the chlorine component almost exclusively. The employment of amounts equimolecular with the lithium reactant assures that this course will be followed. The reaction of the present example goes forward according to the equation

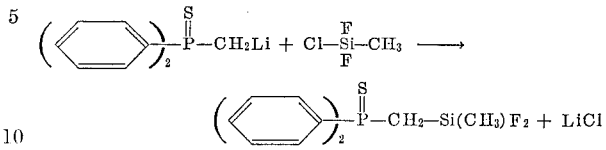

Despite its molecular weight of 116.5 methyldifluorosilicon chloride is a gas and is, correspondingly, introduced into the reaction by the employment of techniques suitable for the introduction of a gas.

More particularly, 2.4 grams (0.01 mole) of (lithiomethyl)diphenylphosphine sulfide are dispersed in 250 milliliters anhydrous nitrogen-purged diethyl ether is chilled over an ice and water bath. 1.16 grams methyldifluorosilicon chloride are diluted with 10 grams nitrogen, and the resulting mixture sparged slowly into the bottom of a tall, narrow vessel containing the dispersion of the lithiomethyl compound. The gas is introduced initially under autogenous pressure, and thereafter the buret is flushed with further nitrogen until, at the conclusion of the addition of the silicon compound gas, nitrogen only is sparged through the resulting mixture. Completion of the reaction is, as usual, apparent from the change to colorless of the originally dark colored lithiomethyl reactant.

As a result of these operations, there is obtained a ((difluoromethylsilyl)methyl)diphenylphosphine sulfide product. Analysis by mass spectrum assigns a molecular weight of 312 plus or minus two mass units, and finds moietal fragments appropriate to the assigned structure.

EXAMPLE 35

The present example is essentially similar to the foregoing except that the halide reactant is trimethylsilicon chloride, a liquid, and is introduced in dispersion in diethyl ether which is first, routinely dehydrated and nitrogen purged.

The present example follows the equation

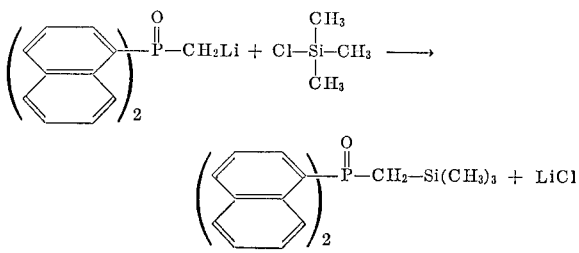

More particularly, 1 gram (0.01 mole) trimethylsilicon chloride dispersed in anhydrous nitrogen-purged diethyl ether (50 milliliters) is added dropwise, at room temperature, over a half hour to a dispersion of 3.2 grams (0.01 mole) of (1-lithiomethyl)di-1-naphthylphosphine oxide. Reaction goes forward at approximately the rate at which the chloride reactant is added, and there is obtained a ((trimethylsilyl)methyl)di-1-naphthylphosphine oxide. Mass spectrum analysis confirms the formula weight of the assigned structure, 386.5.

EXAMPLE 36

In the present example, the lithium reactant is a further portion of the reactant employed in the foregoing example.

The compound is reacted with diethylphenylsilicon chloride according to the equation

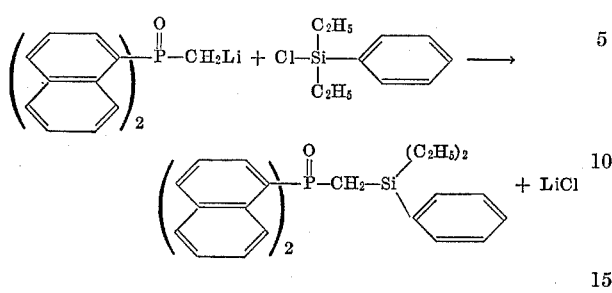

Again employing 0.01 mole quantities, 2 grams diethylphenylsilicon chloride dispersed in 100 milliliters anhydrous nitrogen-purged diethyl ether are added slowly, dropwise, through nitrogen blanket to a dispersion of 3.2 grams (0.01 mole) (1 - lithiomethyl)di - 1-naphthylphosphine oxide dispersed in 250 milliliters diethyl ether, chilled over an ice and water bath, under nitrogen blanket and with continuous stirring. Reaction occurs at approximately the rate at which the reactants are combined. As a result of these operations there is obtained, in somewhat more than 80 percent yield, a ((diethylphenylsilyl)methyl)di-1-naphthylphosphine oxide product. Mass spectrum analysis confirms the assigned structure and finds a molecular weight of 480, plus or minus 2 mass units.

EXAMPLE 37

Allyldimethylsilicon chloride, 1.3 grams, 0.01 mole, dispersed in 50 milliliters anhydrous nitrogen-purged diethyl ether is added dropwise, over a period of approximately a half hour, to a dispersion of 3.64 grams (0.01 mole) of (1 - lithio-n-butyl)di-2-naphthylphosphine oxide dispersed in 250 milliliters anhydrous nitrogen-purged diethyl ether under nitrogen blanket and continuously stirred during the addition. The reaction is according to the equation

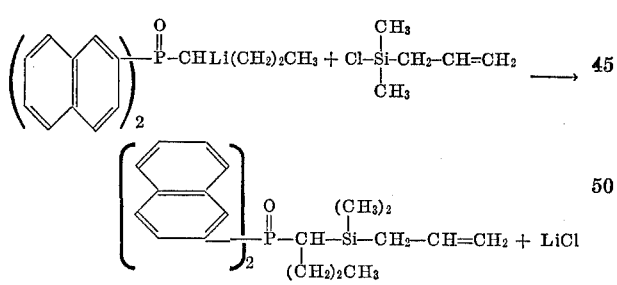

As a result of these operations there is obtained a (1-allyldimethylsilyl)-n-butyl)di - 2-naphthylphosphine oxide product. The product is a white solid apparently crystalline in nature, and the mass spectrum indicates a product molecular weight of 458 plus or minus two mass units.

EXAMPLE 38

In the synthesis of the present example, 3.1 grams (0.01 mole) phenoxydiphenylsilicon chloride dispersed in 50 milliliters anhydrous nitrogen-purged tetrahydrofuran is added at room temperature, dropwise, over a period of approximately a half hour to a dispersion of 4.12 grams (0.01 mole) (1-(bis(p-methoxyphenyl)phosphinoselenoyl)ethyl)magnesium bromide dispersed in 250 milliliters ice-cooled anhydrous nitrogen-purged diethyl ether. Reaction occurs approximately as rapidly as the silion chloride reactant is added. At the conclusion of the reaction time, as indicated by color change, ether reaction medium is vaporized and removed.

The present synthesis process according to the equation

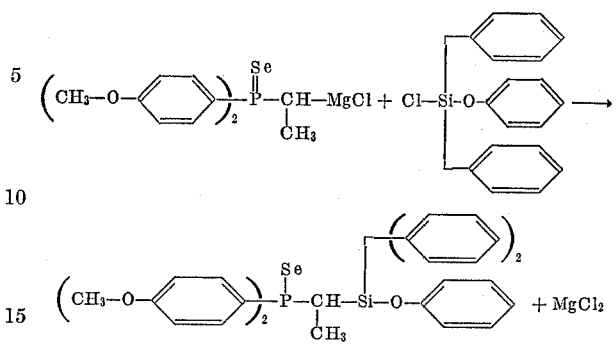

and obtain a (1-(phenoxydiphenylsilyl)ethyl)bis(p-methoxyphenyl)phosphine selenide product. The product is purified by vaporizing and removing reaction medium, washing with toluene and with water and air drying. Mass spectrum analysis confirms the presence of the moieties of the assigned structure, and finds the molecular weight to be 625 plus or minus three mass units.

EXAMPLE 39

Allyldimethylsilicon chloride (1.35 grams, 0.01 mole) dispersed in 50 milliliters anhydrous nitrogen-purged diethyl ether is added dropwise, over a period of approximately a half hour at room temperature to a dispersion of 3.1 grams (0.01 mole) (1 - lithiomethyl)bis(p-nitrophenyl)phosphine oxide in 250 milliliters anhydrous nitrogen-purged diethyl ether chilled over an ice and water bath and stirred continuously during the addition. The reaction follows the equation

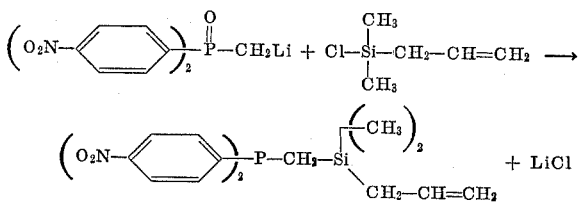

Reaction occurs approximately as rapidly as the silicon chloride reactant is introduced into the mixture. As a result of these procedures there is obtained an ((allyldimethylsilyl)methyl)bis(p - nitrophenyl)phosphine oxide product. Mass spectrum analysis discloses that the substances has a molecular weight of 404 plus or minus two mass units. The product is a white crystalline solid.

EXAMPLE 40

Trimethylsilicon chloride (1 gram, 0.01 mole) dispersed in diethyl ether in the manner of the examples foregoing is added slowly, dropwise, and wtih continuous stirring during a half hour to 4.5 grams (0.01 mole) of (lithiomethyl)bis(2,4-di-tert-butylphenyl)phosphine oxide. The ether reaction medium and conditions are essentially those set forth in the foregoing examples.

The reaction of the present synthesis proceeds according to the equation

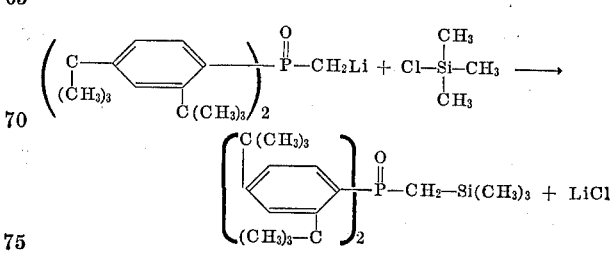

As a result of these operations, there is obtained a ((trimethylsilyl)methyl)bis(2,4 - di - tert - butylphenyl) phosphine oxide product as a white crystalline solid, of which the molecular weight is 510, plus or minus four mass units. Further portions of the mass spectrum confirm the assigned structure.

EXAMPLE 41

Tri-3-pentyl silicon bromide (3.2 grams, 0.01 mole) in anhydrous nitrogen-purged diethyl ether is added dropwise, slowly, and at room temperature to a dispersion of 4.6 grams (0.01 mole (1-(bis(o-n-butoxyphenyl) phosphinyl)propyl)magnesium bromide dispersed in 250 milliliters dry diethyl ether and under nitrogen blanket. Reaction occurs approximately as fast as the silicon bromide reactant is added, with resulting lightening in color. As a result of these operations, there is obtained a (1-(tri-3-pentylsilyl)-n-propyl)bis-(o-n-butoxyphenyl) phosphine oxide product. The product has a formula weight of 629.0.

over approximately a half hour. The reaction follows the equation

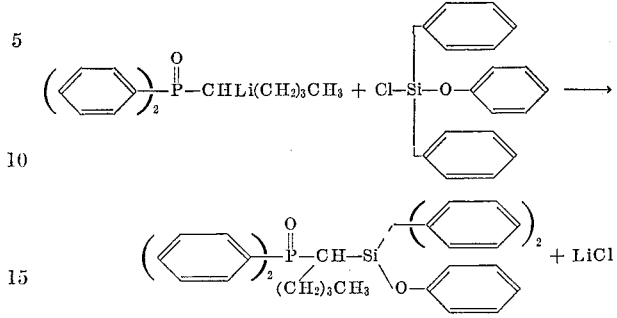

The resulting product compound (1-(phenoxydiphenylsilyl)-n-pentyl)diphenylphosphine oxide has a molecular weight of 547, plus or minus three mass units; other portions of the mass spectrum confirm the assigned structure.

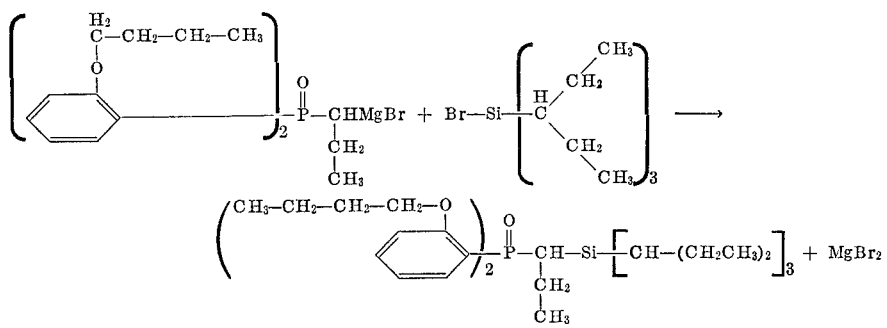

EXAMPLE 42

Two grams, 0.01 mole, diethylphenylsilicon chloride in anhydrous, nitrogen-purged diethyl ether is added dropwise, over approximately a half hour, to 2.4 grams (0.01 mole) (lithiomethyl)diphenylphosphine sulfide dispersed in 250 milliliters anhydrous diethyl ether, nitrogen-purged, nitrogen blanketed, chilled over an ice bath and continuously stirred. Reaction takes place approximately as rapidly as the silicon chloride compound is added.

The reaction follows the equation

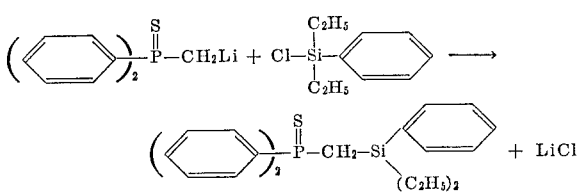

The product compound is ((diethylphenylsilyl)-methyl) diphenylphosphine sulfide, or molecular weight 395 plus or minus two mass units.

EXAMPLE 43

Phenoxydiphenylsilicon chloride (3.1 grams, 0.01 mole) dispersed in anhydrous nitrogen-purged diethyl ether is added at room temperature to 3 grams (0.01 mole) (1-lithio-n-pentyl)diphenylphosphine oxide dispersed in 250 milliliters dry diethyl ether. The resulting mixture is continuously stirred as the silicon chloride compound is added

EXAMPLE 44

2.64 grams (0.01 mole) (1-lithio - n - butyl)diphenylphosphine oxide dispersed in 100 milliliters anhydrous nitrogen-purged diethyl ether and held under nitrogen blanket and dispensed therefrom is added slowly, dropwise, and with continuous stirring to 2 grams (0.01 mole) ethoxymethoxy-n-butylsilicon chloride dispersed in 250 milliliters anhydrous nitrogen-purged chilled diethyl ether over an ice bath. Addition of the lithium reactant takes place during approximately a half hour. At the conclusion of the reaction time, the nitrogen blanket is removed by ventilation, diethyl ether is vaporized and removed along with benzene of reaction remaining in the lithiomethyl compound from its preparation. The resulting product is dispersed in water wherein it is washed and from which it is filtered as an essentially insoluble residue, to obtain a white crystalline (1-(ethoxymethoxy - n - butylsilyl)-n-butyl)diphenylphosphine oxide product. The present synthesis proceeds according to the equation

The product compound has a molecular weight of 420, plus or minus two mass units, as determined by mass spectrometer.

EXAMPLE 45

In manner essentially similar to the foregoing is carried out the synthesis represented by the equation

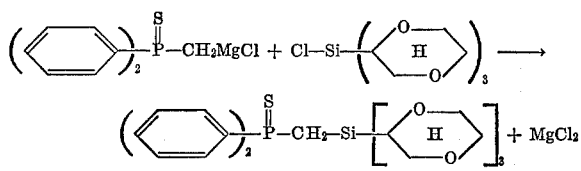

More particularly, 3.2 grams (0.01 mole) tris(p-dioxanyl) silicon chloride dispersed in 100 milliliters dry tetrahydrofuran under nitrogen blanket is added slowly, portionwise, and through nitrogen blanket to 2.9 grams (0.01 mole) of ((diphenylphosphinothioyl)methyl)magnesium chloride dispersed in 250 milliliters anhydrous nitrogen-purged diethyl ether under nitrogen blanket and chilled in an ice bath and stirred continuously during the addition. The resulting reaction obtains a ((tris(p-dioxanyl)silyl)methyl)diphenylphosphine sulfide product having a molecular weight of 520, plus or minus four mass units and a mass spectrum which confirms the assigned structure.

EXAMPLE 46

Diethylphenylsilicon chloride (2 grams, 0.01 mole) dispersed in 50 milliliters anhydrous diethyl ether under nitrogen blanket is added dropwise, over approximately a half hour to 2.7 grams (0.01 mole) (1-lithio-n-butyl)diphenylphosphine oxide dispersed in 260 milliliters anhydrous nitrogen-purged diethyl ether under nitrogen blanket and continuously stirred during the addition. The present synthesis follows the equation

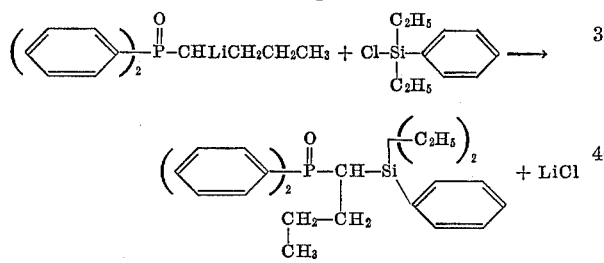

The resulting product ((1-diethylphenylsilyl)-n-butyl)diphenylphosphine oxide has a molecular weight, by mass spectrum, of 421, plus or minus three mass units. This compares with formula weight of 420.619. The product is a white crystalline solid.

EXAMPLE 47

Trimethylsilicon chloride 1.08 grams (0.01 mole) dispersed in 50 milliliters anhydrous nitrogen-purged diethyl ether under nitrogen blanket is added through nitrogen blanket to a dispersion of 2.36 grams (0.01 mole) (1-lithioethyl)diphenylphosphine oxide dispersed in 250 milliliters chilled anhydrous nitrogen-purged diethyl ether which is continuously stirred during the course of the addition. The present example follows the equation

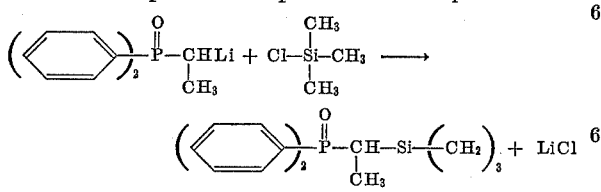

The product, (1 - (trimethylsilyl)ethyl)diphenyl-phosphine oxide, is obtained in good yield and has a molecular weight of 302.

EXAMPLE 48

Triphenylsilicon chloride, 3 grams (0.01 mole) dispersed in anhydrous nitrogen-purged diethyl ether (50 milliliters) and under nitrogen blanket is added slowly, portionwise, and with continuous stirring to 2.22 grams (0.01 mole) (lithiomethyl)diphenylphosphine oxide dispersed in 250 milliliters anhydrous, nitrogen-purged chilled diethyl ether and cooled over an ice and water bath. Addition is carried out during a period of approximately one half hour and the resulting reaction follows the equation

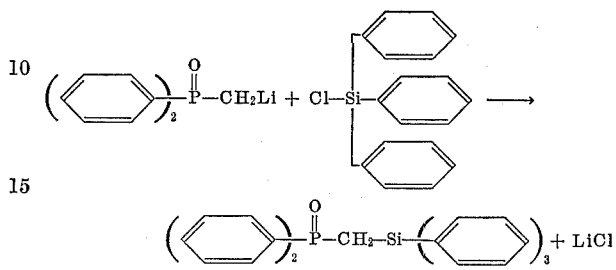

The resulting ((triphenylsilyl)methyl)diphenylphosphine oxide product has a molecular weight of 475, plus or minus three mass units.

EXAMPLE 49

Dicyclohexyphenylsilicon chloride, 3 grams, 0.01 mole, dispersed in 50 milliliters anhydrous nitrogen-purged diethyl ether is added, at room temperature, dropwise during approximately at half hour, to 2.36 grams (0.01 mole) (1-lithioethyl)diphenylphosphine oxide dispersed in 250 milliliters anhydrous diethyl ether under nitrogen blanket. The reaction of the present synthesis follows the equation

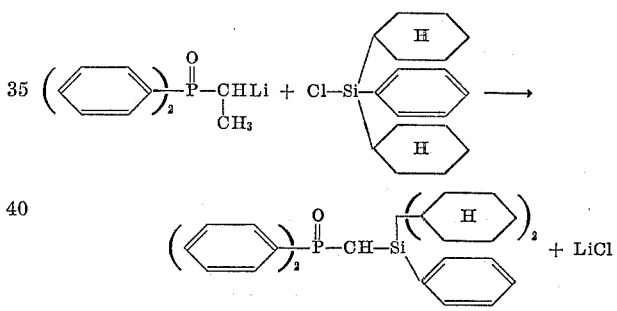

The product (1 - (dicyclohexylphenylsilyl)ethyl)diphenylphosphine oxide is a crystalline colorless solid of which the molecular weights is 500, plus or minus four mass units.

EXAMPLE 50

Allyldimethylsilicon chloride, 1.35 grams (0.01 mole) dispersed in 50 milliliters anhydrous nitrogen-purged diethyl ether and under nitrogen blanket is added, during approximately one half hour, dropwise and at room temperature through nitrogen blanket to 2.25 grams (0.01 mole) (lithiomethyl)diphenylphosphine oxide dispersed in 100 milliliters anhydrous nitrogen-purged diethyl ether chilled over an ice and water bath and stirred continuously during the addition. The present synthesis follows the equation

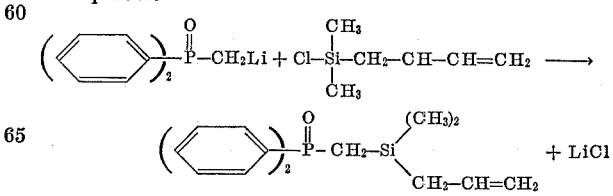

As a result of these procedures, there is obtained an ((allyldimethylsilyl)methyl)diphenylphosphine oxide product as a white crystalline solid of low solubility in water. The product has a molecular weight of 315, plus or minus one mass unit.

EXAMPLE 51

Dimethylphosphinous chloride (1 gram, 0.01 mole) dispersed in 15 milliliters anhydrous nitrogen-purged diethyl ether is added slowly, dropwise, at room temperature and through nitrogen blanket to a dispersion of 2.38 grams (0.01 mole) (lithiomethyl)diphenylphosphine sulfide. The reaction of the present synthesis follows the equation

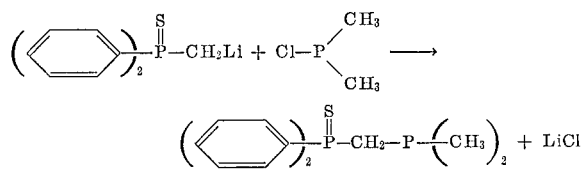

The product, ((dimethylphosphino)methyl)diphenylphosphine sulfide, is of a molecular weight of 293, plus or minus two mass units. The further features of the mass spectrum confirm the assigned structure.

EXAMPLE 52

Dimethylphosphinous chloride, as in the foregoing example, is similarly added to 2.22 grams (0.01 mole) (lithiomethyl)diphenylphosphine oxide. The present synthesis follows the equation

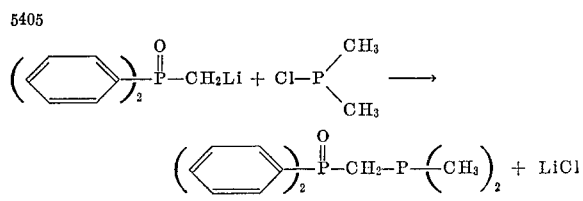

The product, ((dimethylphosphino)methyl)diphenylphosphine oxide, yields a mass spectrum corresponding to the assigned structure and indicating a molecular weight of 275 plus or minus two mass units. The formula weight is 276.259.

EXAMPLE 53

Didodecylphosphinous chloride, 4 grams (0.01 mole) dispersed in 50 milliliters anhydrous nitrogen-purged chilled diethyl ether is added slowly, dropwise, over approximately a half hour to a dispersion of 2.38 grams (lithiomethyl)diphenylphosphine oxide in 250 milliliters anhydrous nitrogen-purged diethyl ether chilled over an ice and water bath and at room temperature. The present synthesis follows the equation

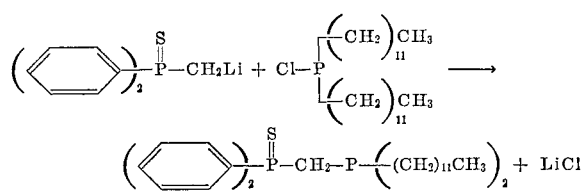

to obtain a ((didodecylphosphino)methyl)diphenylphosphine sulfide product. The product has a molecular weight of 601 plus or minus four mass units.

EXAMPLE 54

In procedures essentially the same as those of the foregoing example, di-2-naphthylphosphinous-bromide is reacted with (1-lithioethyl)diphenylphosphine oxide to obtain a (1-(di - 2 - naphthylphosphino)ethyl)diphenylphosphine oxide product. The mass spectrum confirms the assigned structure and indicates a molecular weight of 515, plus or minus four mass units. The synthesis is according to the equation

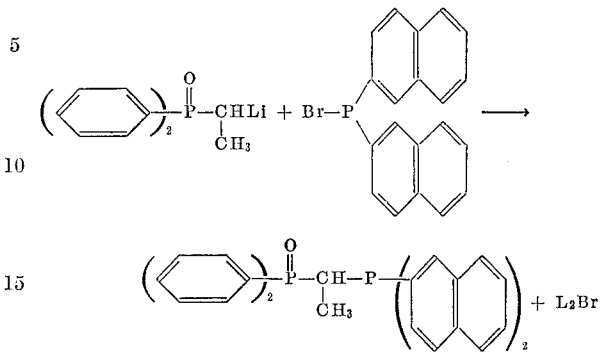

EXAMPLE 55

Diphenylphosphinous chloride, 2.2 grams (0.01 mole) is reacted in the manner of the examples foregoing with an equimolecular amount of (lithiomethyl)-bis(m-(methylsulfonyl)phenyl)phosphine sulfide (3.9 grams, 0.01 mole) to obtain a ((diphenylphosphino)-methyl)bis(m-(methylsulfonyl)phenyl)phosphine sulfide product. Of this product, the mass spectrum confirms the assigned structure and indicates a molecular weight of 575, plus or minus three mass units. The reaction follows the equation

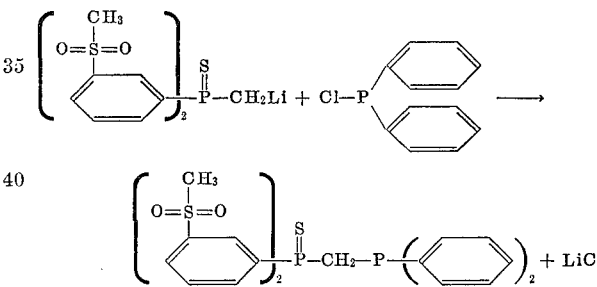

EXAMPLE 56

In essentially the manner of the examples foregoing, dimorpholinophosphinous chloride and an equimolecular amount of (lithiomethyl)bis(m - biphenylyl)-phosphine oxide are reacted in a synthesis which follows the equation

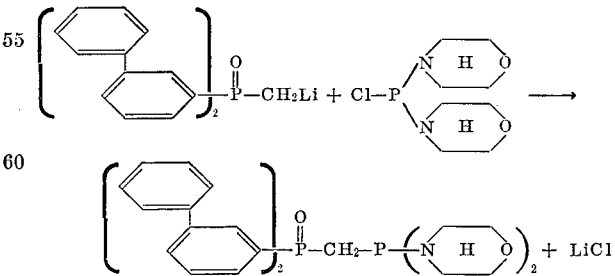

to obtain a ((dimorpholinophosphino)methyl)bis(m-biphenylyl)phosphine oxide product of a molecular weight of 570, plus or minus four mass units.

EXAMPLE 57

S,S-di-1-naphthyl phosphorobromidothioate (4.5 grams, 0.01 mole) is reacted in a manner indicated in the examples foregoing with 3.9 grams (0.01 mole) of (lithiomethyl)bis(p - (methylsulfonyl)phenyl)phosphine sulfide. The present synthesis is according to the equation

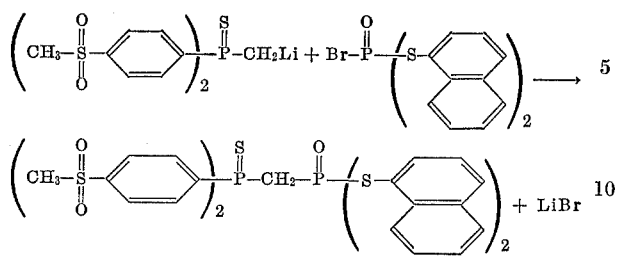

As a result of these operations, there is obtained a (bis(p - (methylsulfonyl)phenyl)phosphinothioyl)(bis(1-naphthylthio)phosphinyl)methane, of molecular weight 753, plus or minus five mass units. The mass spectrum is compatible with the assigned structure.

EXAMPLE 58

Dimethyltin chloride, 2.2 grams (0.01 mole) dispersed in 50 milliliters anhydrous nitrogen-purged diethyl ether at room temperature under nitrogen blanket is added slowly, portionwise, during approximately a half hour to a dispersion of 5.5 grams (0.02 mole) (lithiomethyl)bis (m-biphenylyl)phosphine oxide. It is to be noted that, there being two chlorine atoms attached to the tin of the tin chloride reactant and available for reaction, the stoichiometry of the present reaction requires 2 molecular proportions of the lithium compound to be carried forward to completion. As a result of these operations, there is obtained a (dimethylstannylenedimethylene)bis(m-diphenylyl)phosphine oxide) product. The present synthesis is represented by the equation

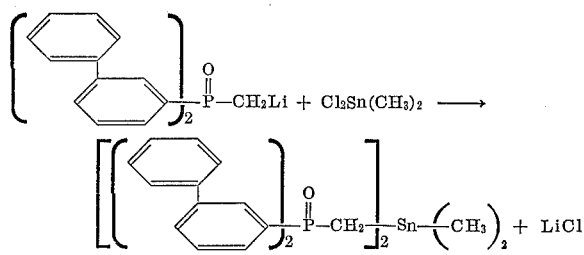

Upon completion of the reaction, as indicated by decolorizing of the lithiated reactant, diethyl ether reaction medium is vaporized and removed, the resulting product is washed in benzene, vacuum oven dried, washed with water, and again vacuum oven dried. The resulting product is a white crystalline solid of molecular weight higher than can be scanned directly in the available mass spectrometer. However, an authentic sample is available of the 6,7-diacetate 15-2-methylbutyrate 3-4-nitrohexanoate of protoverine (melting at 187°–188° C.) which is used as reference standard. The reference standard compound has a molecular weight of 836.9. It is ascertained by comparison of the mass spectra that the molecular weight of the product of the present example differs by less than three mass units from that of the reference of standard.

EXAMPLE 59

In procedures essentially the same as those foregoing, bis(p-ethoxyphenyl)phosphinic bromide is reacted with an equimolecular proportion of lithiomethyl bis(p-ethoxyphenyl)phosphine oxide in diethyl ether, according to the equation

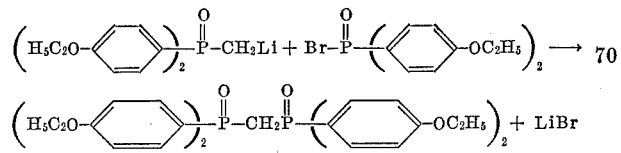

The product is bis(bis(p - ethoxyphenyl)phosphinyl) methane, a white crystalline solid, of molecular weight, as determined by mass spectrum, of 350 mass units, plus or minus two mass units. Infrared spectrum confirms the assigned structure.

EXAMPLE 60

In procedures essentially the same as those foregoing, equimolecular quantities of (bis(2,4 - dimethoxyphenyl) phosphinyl)methylmagnesium bromide and bis(2,4 - dimethoxyphenyl)phosphinic bromide are reacted together in diethyl ether to obtain (bis(2,4-dimethoxyphenyl)phosphinyl)(bis(2,4 - methoxyphenyl)phosphinyl)methane. This reaction is of the equation

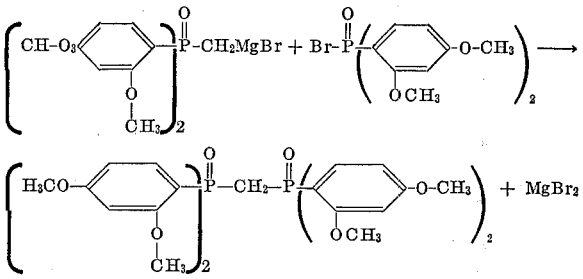

The metathesis products of the present invention are of use in a variety of pesticidal and pest-repellent activities. Certain of them are insecticides. For such use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions, or water dispersions with or without the aid of dispersing or emulsifying agents. In a representative operation, the application of diphenyl (triphenylstannyl)-methyl-phosphine oxide in aqueous dispersion as sole toxicant to a group of healthy young houseflies, in a concentration of 0.05 percent of toxicant by weight of aqueous dispersion results in a complete kill of the houseflies. The compounds are also arachnicidal, and useful for the control of spider mites infesting economic plants. The compound above identified, dispersed in water as sole toxicant in a concentration of one part of toxicant per ten thousand parts of resulting dispersion, applied to young bean plants heavily infested with *Tetranychus bimaculatus* Harvey ("two-spotted spider mites") results in complete kill of the spider mites.

The compounds are useful also as microbiocides and are especially adapted for the control of mold fungi that attack moist organic substrates, as well as various pathogenic bacteria.

I claim:
1. Compound of the formula

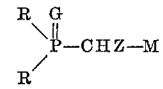

wherein each R is a member of the group consisting of naphthyl, substituted phenyl and substituted naphthyl, wherein any substituent is a member of the group consisting of nitro, phenyl, phenoxy, loweralkylsulfonyl, phenylsulfonyl, loweralkyl and loweralkoxy,
G is a chalkogen of atomic number 7 to 35, both inclusive,
Z is a member of the group consisting of hydrogen and loweralkyl,
M is a member of the group consisting of lithium and MgH', wherein X' is a halogen selected from loweralkyl and loweralkoxy contain from 1 to 8, both inclusive, carbon atoms.
2. Compound of the formula

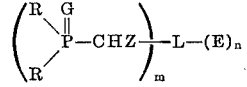

wherein each R is a member of the group consisting of phenyl, naphthyl, substituted phenyl and substituted naphthyl, wherein any substituent is selected from the group consisting of nitro, phenyl, phenoxy, loweralkylsulfonyl, phenylsulfonyl, loweralkyl and loweralkoxy, G is a chalkogen of atomic number from 7 to 35, both inclusive, Z is a member of the group consisting of hydrogen and loweralkyl, L is isoelectronic with one of neon, argon, krypton and xenon and selected from the group consisting of phosphorus, silicon and tin, and m and n are integers that the valence total of E in its n occurrences and the group

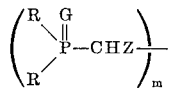

in its m occurrences is the valence of L, E is a member of the group consisting of divalent oxygen, divalent sulfur, an acyclic aliphatic radical of up to and including 20 carbon atoms bonded to L through oxygen, an acyclic aliphatic radical of up to and including 20 carbon atoms bonded to L through sulfur, a naphthyl radical, an aromatic radical selected from the group consisting of substituted phenyl and substituted naphthyl and containing up to 20 carbon atoms, and aromatic radical bonded to L through oxygen and selected from the group consisting of substituted phenyl and substituted naphthyl and containing up to 20 carbon atoms, an aromatic radial bonded to L through oxygen and selected from the group consisting of phenyl and naphthyl, an aromatic radical bonded to L through sulfur and selected from the group consisting of substituted phenyl and substituted naphthyl and containing up to 20 carbon atoms, an aromatic radical bonded to L through sulfur and selected from the group consisting of phenyl and naphthyl, a cycloaliphatic radical of up to and including 6 ring atoms, a cycloaliphatic radical of up to and including 6 ring atoms bonded to L through oxygen, a cycloaliphatic radical of up to and including 6 ring atoms bonded to L through sulfur, a heterocyclic radical selected from the group consisting of pyridyl, morpholino and dioxanyl, a heterocyclic radical bonded to L through oxygen and selected from the group consisting of pyridyl, morpholino and dioxanyl, and a heterocyclic radical selected from the group consisting of pyridyl, morpholino and dioxanyl bonded to L through sulfur, all substituents upon any of said acyclic aliphatic, cycloaliphatic, aromatic, and heterocyclic nuclei being selected from the group consisting of loweralkoxy, loweralkoxysulfonyl, nitro, fluoro, chloro, phenyl, phenoxy, substituted phenyl whereof the substituents are of this group above identified, and loweralkyl, wherein loweralkyl and loweralkoxy contain from 1 to 8, both inclusive, carbon atoms.

3. 1-(diphenylphosphinyl)butyllithium.
4. 1-(diphenylphosphinyl)pentyllithium.
5. Di(1-naphthyl)phosphinylmethyllithium.
6. 1-(di-2-naphthyl)phosphinylbutyllithium.
7. 1-(bis-(m-methoxyphenyl)phosphinyl)octyllithium.
8. Bis(o-(methoxy)phenyl)phosphinothioylmethylmagnesium chloride.
9. 1-(bis(o-(butoxy)phenyl)phosphinyl)propyllithium.
10. Bis(m-tolyl)phosphinylbutylmagnesium bromide.
11. Bis(2,4-ditertiarybutylphenyl)phosphinylmethyllithium.
12. 1-(bis(nitrophenyl)phosphinoselenoyl)ethylmagnesium iodide.
13. Bis(p-nitrophenyl)phosphinylmethyllithium.
14. Bis(m-(methylsulfonyl)phenyl)phosphinothioylmethyllithium.
15. Bis(p-(methylsulfonyl)phenyl)phosphinothioylmethyllithium.
16. Bis(m-biphenylyl)phosphinylmethyllithium.
17. Diphenylphosphinoselenoylmethyllithium.
18. ((Diphenylphosphinyl)methyl)magnesium bromide.
19. ((Diphenylphosphino)methyl)diphenylphosphineselenide.
20. ((Di-2-naphthylphosphino)methyl)di-1-naphthylphosphine oxide.
21. (1-(bis(2-methylpropenyl)phosphino)-n-butyl)di-phenylphosphine oxide.
22. (1-(bis(2,4,5-trichlorophenyl)phosphino)ethyl)-diphenylphosphine oxide.
23. ((Bis(dichloromethyl)phosphino)methyl)di-phenylphosphine oxide.
24. 1-(diphenylphosphino)-1-(diphenylphosphinothioyl)-n-butane.
25. (1-(bis(p-dioxanyl)phosphino)-n-propyl)bis(o-butoxy)phenyl)phosphine oxide.
26. ((Bis(p-(methylsulfonyl)phenyl)phosphinyl)-methyl)bis(p-(methylsulfonyl)phenyl)phosphine sulfide.
27. ((Bis(2-chloro-4-nitrophenyl)phosphino)methyl)-bis(m-(methylsulfonyl)phenyl)phosphine sulfide.
28. (1-(di-cyclopropylphosphino)ethyl)bis(p-ethylphenyl)phosphine selenide.
29. 1-(diphenylphosphinyl)-1-(bis(2,4,5-trichloropiperidino)phosphinyl)-n-butane.
30. (Di-1-naphthylphosphinyl)(cyclohexylmethylphosphinyl)methane.
31. (Bis(p-nitrophenyl)phosphinyl)(bis(p-nitrophenyl)-phosphinylthioyl)methane.
32. 1-(di-2-naphthylphosphinyl)-1-(bis(p-nitrosulfonyl)phenyl)phosphinyl)-n-butane.
33. 1-(diphenylphosphinothioyl)-1-(bis(dodecyloxy)-phosphinyl)-n-butane.
34. (Bis(2-methoxyphenyl)phosphinothioyl)(bis-(morpholinoöxy)phosphinyl)methane.
35. ((Chlorothioacetyl)methyl)bis(p-phenoxyphenyl)-phosphine sulfide.
36. (Bis(m-biphenylyl)phosphinyl)(bis(p-(methylsulfonyl)phenoxy)phosphinothioyl)methane.
37. ((Triphenylsilyl)methyl)diphenylphosphine sulfide.
38. ((Methoxyethoxy-n-butylsilyl)methyl)diphenylphosphine sulfide.
39. ((Dicyclohexylphenylsilyl)methyl)diphenylphosphine selenide.
40. ((Trimethylsilyl)methyl)bis(m-(methylsulfonyl)-phenyl)phosphine sulfide.
41. ((Dicyclohexylphenylsilyl)methyl)bis(p-(methylsulfonyl)phenyl)phosphine sulfide.
42. ((Triphenylsilyl)methyl)bis(m-biphenylyl)phosphine oxide.
43. Diphenyl(triphenylstannylmethyl)phosphine oxide.
44. ((Triphenylstannyl)methyl)bis(p-(methylsulfonyl)-phenyl)phosphine sulfide.
45. ((Di-4-pyridylphosphino)methyl)bis-diphenylphosphine sulfide.
46. (1-(dicyclohexylphosphino)-n-pentyl)diphenylphosphine oxide.
47. ((Difluoromethylsilyl)methyl)diphenylphosphine sulfide.
48. ((Trimethylsilyl)methyl)di-1-naphthylphosphine oxide.
49. ((Dithylphenylsilyl)methyl)di-1-naphthylphosphine oxide.
50. (1-(allyldimethylsilyl)-n-butyl)di-2-naphthylphosphine oxide.
51. (1-(phenoxydiphenylsilyl)ethyl)bis(p-methoxyphenyl)phosphine selenide.
52. ((Allyldimethylsilyl)methyl)bis(p-nitrophenyl)-phosphine oxide.
53. ((Trimethylsilyl)methyl)bis(2,4-di-tert-butylphenyl)phosphine oxide.
54. (1-(tri-3-pentylsilyl)-n-propyl)bis(o-n-butoxyphenyl)phosphine oxide.

55. ((Diethylphenylsilyl)methyl)diphenylphosphine sulfide.
56. (1-(phenoxydiphenylsilyl)-n-pentyl)diphenylphosphine oxide.
57. (1-(ethoxymethoxy-n-butylsilyl)-n-butyl)diphenylphosphine oxide.
58. ((Tris(p-dioxanyl)silyl)methyl)diphenylphosphine sulfide.
59. ((1-diethylphenylsilyl)-n-butyl)diphenylphosphine oxide.
60. (1-(trimethylsilyl)ethyl)diphenylphosphine oxide.
61. ((Triphenylsilyl)methyl)diphenylphosphine oxide.
62. (1-(dicyclohexylphenylsilyl)ethyl)diphenylphosphine oxide.
63. ((Allyldimethylsilyl)methyl)diphenylphosphine oxide.
64. ((Dimethylphosphino)methyl)diphenylphosphine sulfide.
65. ((Dimethylphosphino)methyl)diphenylphosphine oxide.
66. ((Didodecylphosphino)methyl)diphenylphosphine sulfide.
67. (1-(di-2-naphthylphosphino)ethyl)diphenylphosphine oxide.
68. ((Diphenylphosphino)methyl)bis(m-(methylsulfonyl)-phenyl)phosphine sulfide.
69. ((Dimorpholinophosphino)methyl)bis(m-biphenylyl)phosphine oxide.
70. (Bis(p-(methylsulfonyl)phenyl)phosphinothioyl)(bis(1-naphthylthio)phosphinyl)methane.
71. (Dimethylstannylenedimethylene)bis(bis(m-biphenylyl)phosphine oxide).
72. Bis(bis(p-ethoxyphenyl)phosphinyl)methane.
73. (Bis(2,4-dimethoxyphenyl)phosphinyl)(bis(2,4-methoxyphenylphosphinyl)methane.

References Cited

Seyferth et al., J.A.C.S., vol. 85, pp. 642–643 (1963).
Seyferth et al., J.A.C.S., vol. 86, pp. 1100–1105 (1964).

HENRY R. JILES, *Primary Examiner.*

R. T. BOND, *Assistant Examiner.*

U.S. Cl. X.R.

167—33; 260—247, 247.1, 290, 293, 294.8, 340.6, 429.7, 448.2, 465, 526, 606.5, 964, 966

UNITED STATES PATENT OFFICE
CERTIFICATE OF CORRECTION

Patent No. 3,426,021                                      February 4, 1969

Dietmar Seyferth

It is certified that error appears in the above identified patent and that said Letters Patent are hereby corrected as shown below:

Column 11, line 44, "(1-lithioethyldiphenylphosphine" should read -- (1-lithioethyl)diphenylphosphine --. Column 12, line 46, "aquimolecular" should read -- equimolecular --. Column 13, lines 32 to 50, the formula should appear as shown below:

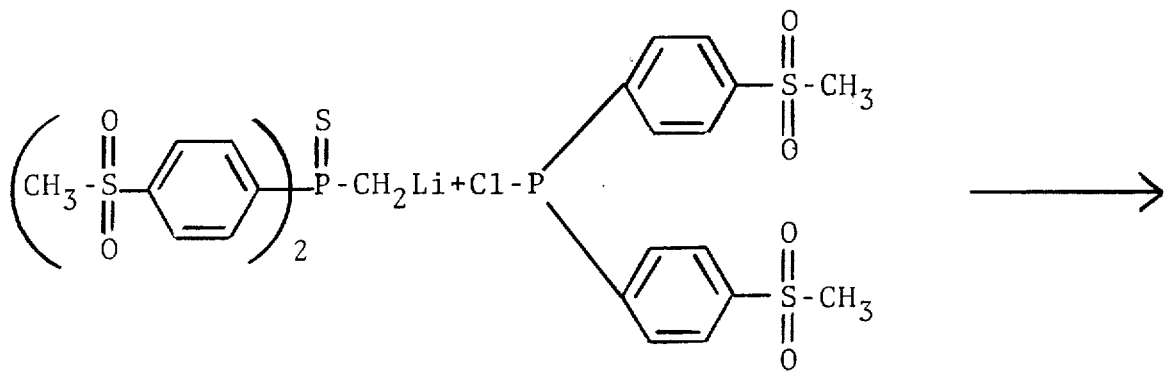

Column 14, lines 25 to 31, the left-hand portion of the formula should appear as shown below:

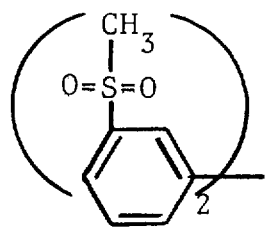

Column 15, lines 13 to 17, the formula should appear as shown below:
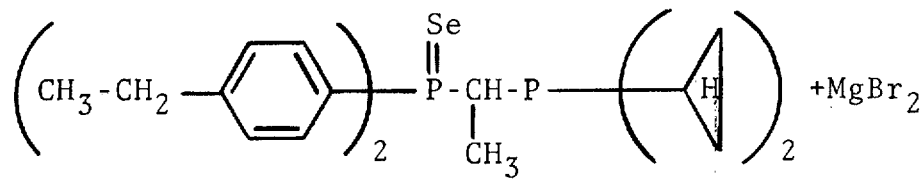
same column 15, lines 49 to 54, the formula should appear as shown below:
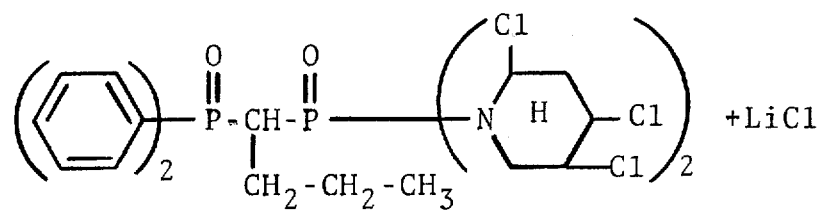
Column 16, lines 14 to 19, the last part of the formula should appear as shown below:
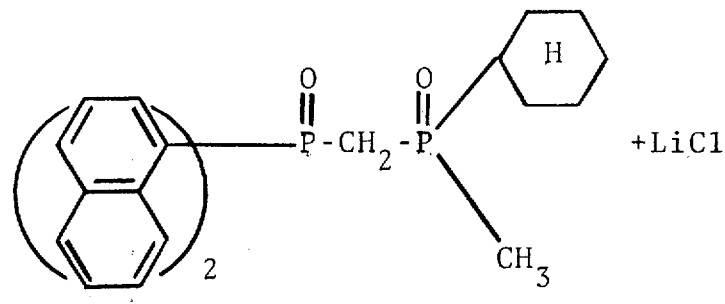
same column 16, lines 62 to 68, the formula should appear as shown below:

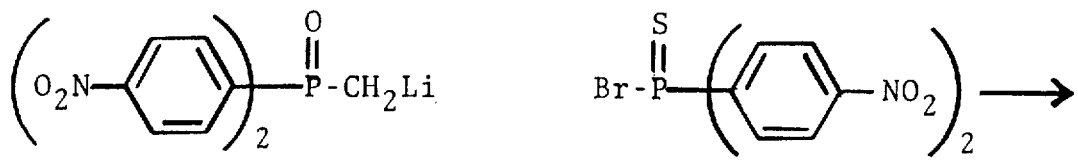

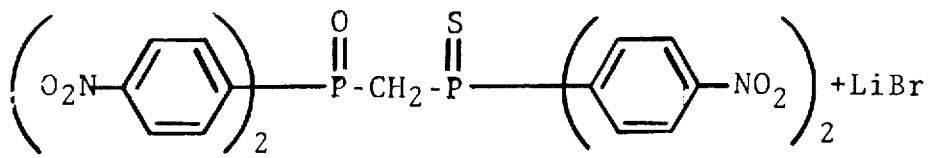

Column 17, line 1, "then" should read -- the --; line 30, "939.3" should read -- 839.3 --. Column 18, lines 30 to 35, the last half of the formula should appear as shown below:

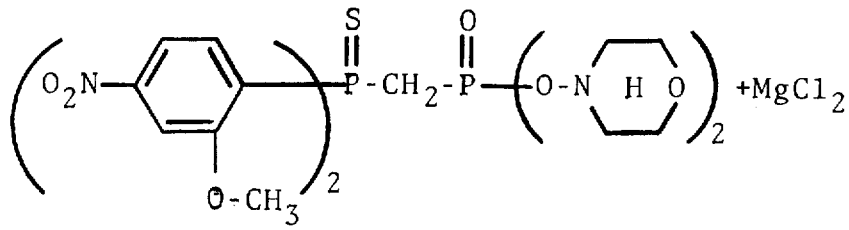

same column 18, line 47, "632,541" should read -- 632.541 --. Column 19, line 47, "(lithiomethyl)bis(m-biphenyly)phosphine" should read -- (lithiomethyl)bis(m-biphenylyl)phosphine --; line 64, "(bis)p-" should read -- (bis(p- --. Column 20, line 22, "and", first occurrence, should read -- with --. Column 21, lines 43 to 54, the formula should appear as shown below:

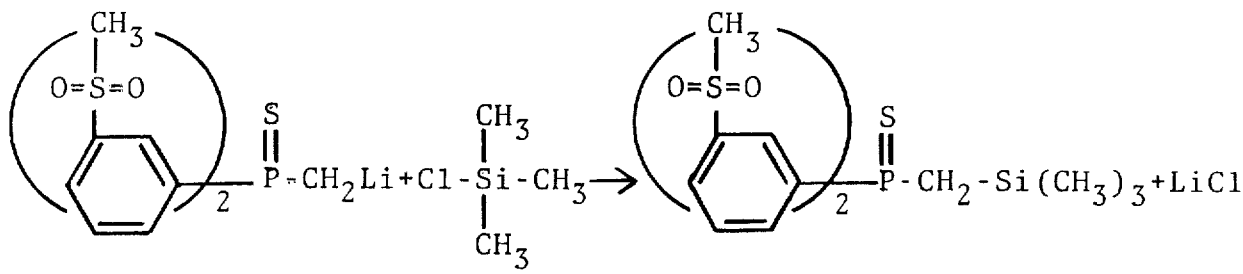

Column 22, lines 73 to 75, the second part of the formula should appear as shown below:

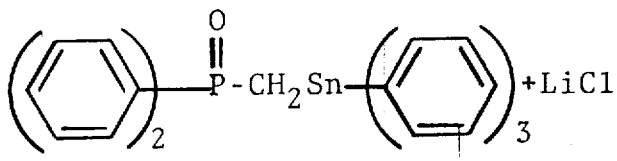

Column 26, line 1, "process" should read -- proceeds --. Column 27, line 64, "or" should read -- of --. Column 30, line 24, "Dicyclohexyphenylsilicon" should read -- Dicyclohexylphenylsilicon --; line 27, "at" should read -- a --; lines 40 to 44, the formula should appear as shown below:

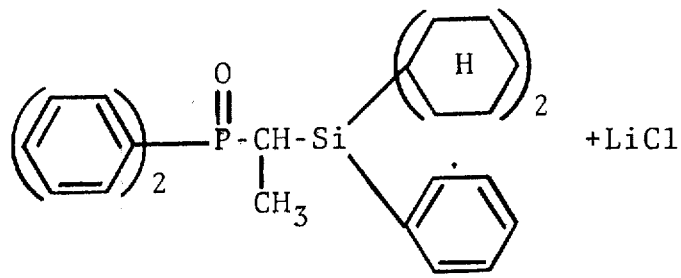

same column 30, lines 60 to 63, the formula should appear as shown below:

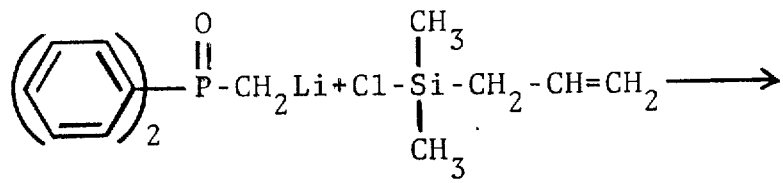

Column 31, line 29, cancel "5406". Column 32, lines 14 to 20, the formula should appear as shown below:

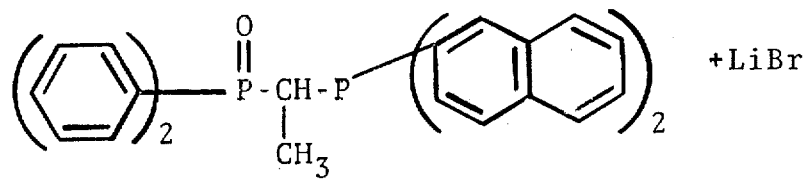

Column 33, lines 32 and 33, "(dimethylstannylenedimethylene)-bis(m-diphenylyl)phosphine oxide)" should read -- (dimethylstannylenedimethylene)bis(bis(m-diphenylyl)phosphine oxide) --. Column 34, lines 13 to 18, that portion of the formula reading "CH-O$_3$" should read -- H$_3$CO— --; line 68, "MgH′" should read -- MgX′ --; same line 68, after "from" insert -- the group consisting of chloro, bromo and iodo, and --. Column 35, line 13, after "are" insert -- such --; line 29, "and" should read -- an --; line 55, "loweralkoxysulfonyl" should read -- loweralkylsulfonyl --. Column 36, lines 32 and 33, "1-(di-2-naphthylphosphinyl)-1-(bis(p-nitrosulfonyl)phenyl)phosphinyl)-n-butane" should read -- 1-(Di-2-naphthylphosphinyl)-1-(bis(p-(phenylsulfonyl)phenyl)phosphinyl)-n-butane --; line 64, "((Dithylphenylsilyl)methyl)di-" should read -- ((Diethylphenylsilyl)methyl)di- --.

Signed and sealed this 7th day of April 1970.

(SEAL)
Attest:

EDWARD M. FLETCHER, JR.
Attesting Officer

WILLIAM E. SCHUYLER, JR.
Commissioner of Patents